United States Patent [19]

Ando et al.

[11] Patent Number: 5,719,230
[45] Date of Patent: Feb. 17, 1998

[54] POWDER COATING COMPRISING NOVEL CURABLE POLYESTER COMPOSITION

[75] Inventors: Hiroshi Ando; Toshinobu Nakata; Masato Kusakabe; Shigeki Hamaguchi, all of Hyogo, Japan

[73] Assignee: Kanegafuchi Kagaku Kogyo Kabushiki Kaisha, Osaka, Japan

[21] Appl. No.: 547,831

[22] Filed: Oct. 25, 1995

[30] Foreign Application Priority Data

Oct. 26, 1994 [JP] Japan .................................. 6-284526

[51] Int. Cl.$^6$ ........................................ C08L 83/05
[52] U.S. Cl. ................................ 525/29; 525/446
[58] Field of Search ........................ 525/29, 446

[56] References Cited

U.S. PATENT DOCUMENTS

| | | | |
|---|---|---|---|
| 5,321,082 | 6/1994 | Ohsugi et al. | 525/101 |
| 5,409,995 | 4/1995 | Iwahara et al. | 525/100 |
| 5,416,147 | 5/1995 | Tankarada et al. | 524/399 |
| 5,580,925 | 12/1996 | Iwahara et al. | 525/100 |

OTHER PUBLICATIONS

Powder Coating:Why–How–When, Journal of Paint Technology, vol. 44, No. 565, Feb. 1972, pp. 30–37.

*Primary Examiner*—Ralph H. Dean
*Attorney, Agent, or Firm*—Armstrong, Westerman, Hattori, McLeland & Naughton

[57] ABSTRACT

The present invention provides a powder coating having an excellent curability which can be baked without evaporation of a blocking agent as compared with the conventional powder coating to provide a coat having an excellent yellowing resistance an improved smoothness and weather resistance. A novel powder coating containing, as a main component, a polyester resin composition is provided, comprising (A) an alkenyl group-containing polyester resin with a number-average molecular weight of from 500 to 100,000 having at least 1.2 alkenyl groups on the average per molecule, (B) a Si—H group-containing curing agent having at least two Si—H groups per molecule, and (C) a catalyst active in hydrosilylation.

19 Claims, No Drawings

POWDER COATING COMPRISING NOVEL CURABLE POLYESTER COMPOSITION

FIELD OF THE INVENTION

The present invention relates to a powder coating comprising a polyester resin composition excellent in curability as well as in smoothness, physical properties and weather resistance in the form of coat.

BACKGROUND OF THE INVENTION

As polyester powder coatings there have been heretofore known a hydroxyl group-containing resin having a multifunctional isocyanate compound (ε-caprolactam-blocked isophorone diisocyanate) incorporated therein as a curing agent and a carboxyl group-containing resin having a multifunctional epoxy compound (triglycidyl isocyanurate) incorporated therein as a curing agent. However, the isocyanate-curing polyester powder coating is disadvantageous in that the evaporation of a blocking agent causes stain on the baking furnace or does harm to human body. Further, the epoxy-curing polyester powder coating is disadvantageous in that it does harm to human body or gives rash to the skin. As solutions to these problems, the use of bis(N,N-dihydroxyethyl)adipamide or tetramethoxymethyl glycol uryl compound as a curing agent has been proposed. However, bis(N,N-dihydroxyethyl)adipamide produces condensation water as a by-product to form skim on the resulting coat. In the case of tetramethoxymethyl glycol uryl, methanol is produced as a by-product to cause similar trouble. Thus, these curing agents leave something to be desired. Further, bis(N,N-dihydroxyethyl)adipamide is also disadvantageous in that the resulting coat is liable to yellowing during baking.

Moreover, the conventional polyester powder coating is also disadvantageous in that the polyester resin must have a raised melt viscosity during heat melting to meet requirements for mechanical properties of the resulting coat and powder properties such as blocking resistance. Thus, the resulting coat exhibits insufficient smoothness.

On the other hand, JP-A-3-95266 (The term "JP-A" as used herein means an "unexamined published Japanese patent application") discloses a curable composition which utilizes the crosslinking of an alkenyl group-containing organic resin by the hydrosilylation reaction with a Si—H group-containing organic curing agent but doesn't refer to the use of this composition as a coating. JP-A-3-277645 discloses that the crosslinking of an alkenyl group-containing organic resin by the hydrosilylation reaction with an organohydrogen siloxane makes it possible to improve various properties such as solvent resistance, alkali resistance, acid resistance, water resistance, brine resistance, corrosion resistance and stain resistance. However, this patent doesn't refer to the application of hydrosilylation reaction to the field of an organic solvent-free powder coating which stays powdered solid at room temperature unlike ordinary solvent coating, high solid coating or aqueous coating. Thus, the effects of the application of hydrosilylation reaction to such a field has been unknown.

As a result of extensive investigations to solve these defects of the conventional powder coatings, the inventors have found the following knowledge. In other words, a powder coating containing a resin composition, which comprises an alkenyl group-containing polyester resin, a Si—H group-containing curing agent and a hydrosilylation catalyst, can undergo hydrosilylation reaction to perform curing. Thus, such a powder coating causes no stain on the furnace due to volatile content from the curing agent. Further, the coat thus formed has no skim developed thereon. As compared with the conventional powder coatings, such a composition exhibits a low melt viscosity during heat melting. Thus, the resulting coat can exhibit an improved smoothness, yellowing resistance during baking and weather resistance. Thus, the present invention has been completed by the findings.

SUMMARY OF THE INVENTION

It is therefore an object of the present invention to provide a powder coating having an excellent curability which can be baked without evaporation of a blocking agent as compared with the prior art powder coating to provide a coat having an excellent yellowing resistance and an improved smoothness and weather resistance.

The foregoing object of the present invention will become more apparent from the following detailed description and examples.

The foregoing object of the present invention can be accomplished by the use, as a powder coating, of a polyester resin composition comprising a specific alkenyl group-containing polyester resin having alkenyl group, a specific compound, as a curing agent, containing Si—H group which can undergo hydrosilylation reaction with alkenyl group and having a good compatibility with the alkenyl group-containing polyester resin, and a catalyst having a catalytic activity in hydrosilylation reaction such as platinum.

That is, the present invention relates to the following constitutions:

(1) A powder coating containing, as a main component, a polyester resin composition comprising (A) an alkenyl group-containing polyester resin with a number-average molecular weight of from 500 to 100,000 having at least 1.2 alkenyl groups on the average per molecule, (B) a Si—H group-containing curing agent having at least two Si—H groups per molecule, and (C) a catalyst active in hydrosilylation;

(2) The powder coating according to Clause 1, wherein said Si—H group-containing curing agent is represented by formula (1):

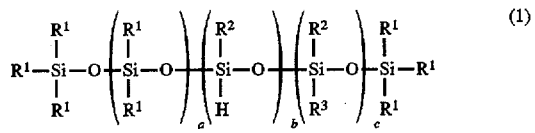

wherein $R^1$ and $R^2$ each represent a $C_{1-7}$ alkyl group or a phenyl group; $R^3$ represents an organic group having a molecular weight of not less than 100; a represents an integer of from not less than 0 to not more than 100 ($0 \leq a \leq 100$); b represents an integer of from not less than 2 to not more than 100 ($2 \leq b \leq 100$); and c represents an integer of from not less than 0 to not more than 100 ($0 \leq c \leq 100$);

(3) The powder coating according to Clause 1, wherein said Si—H group-containing curing agent is represented by formula (2):

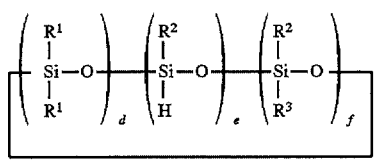

(2)

wherein $R^1$, $R^2$ and $R^3$ are as defined above; d represents an integer of from not less than 0 to not more than 8 ($0 \leq d \leq 8$); e represents an integer of from not less than 2 to not more than 10 ($2 \leq e \leq 10$); and f represents an integer of from not less than 0 to not more than 8 ($0 \leq f \leq 8$), with the proviso that d, e and f satisfy the relationship $3 \leq d+e+f \leq 10$;

(4) The powder coating according to Clause 1, wherein said Si—H group-containing curing agent is represented by formula (3):

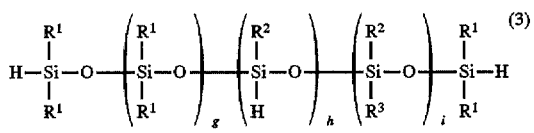

(3)

wherein $R^1$, $R^2$ and $R^3$ are as defined above; g represents an integer of from not less than 0 to not more than 100 ($0 \leq g \leq 100$); h represents an integer of from not less than 2 to not more than 100 ($2 \leq h \leq 100$); and i represents an integer of from not less than 0 to not more than 100 ($0 \leq i \leq 100$);

(5) The powder coating according to Clause 1, wherein said Si—H group-containing curing agent is an organic group-modified hydrogen polysiloxane with a molecular weight of from 300 to 50,000 having at least one Si—H group-containing substituents represented by formula (4) and/or formula (5):

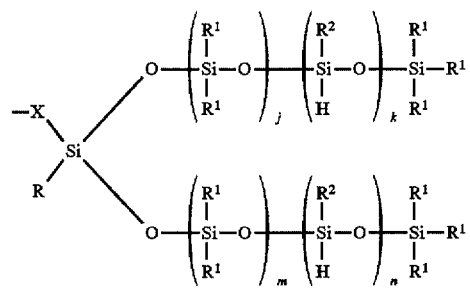

(4)

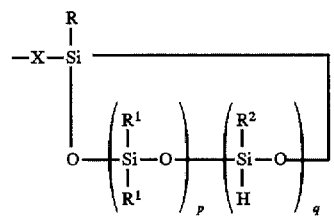

(5)

wherein $R^1$ and $R^2$ are as defined above; j, k, m and n each represent 0 or a positive integer, with the proviso that j, k, m and n satisfy the relationships $0 \leq j+m \leq 100$ and $1 \leq k+n \leq 100$; p represents an integer of from not less than 0 to not more than 8 ($0 \leq p \leq 8$); q represents an integer of from not less than 1 to not more than 10 ($1 \leq q \leq 10$), with the proviso that p and q satisfy the relationship $3 \leq p+q \leq 10$; X represents a divalent bonding group such as —O—, —COO— and —CH$_2$CH$_2$—; and R represents a monovalent substituent selected from the group consisting of H, OSi(CH$_3$)$_3$ and C$_{1-10}$ organic group, in the molecule or at the end of an organic polymer or an organic group having a molecular weight of not less than 100;

(6) The powder coating according to any one of Clauses 2 to 4, wherein said organic group $R^3$ is a polyester polymer;

(7) The powder coating according to any one of Clauses 2 to 4, wherein said organic group $R^3$ is an acrylic polymer;

(8) The powder coating according to any one of Clauses 2 to 4, wherein said organic group $R^3$ comprises a saturated hydrocarbon polymer and/or hydrocarbon chain;

(9) The powder coating according to Clause 2, wherein the suffix c is an integer of from not less than 1 to not more than 100;

(10) The powder coating according to Clause 3, wherein the suffix f is an integer of from not less than 1 to not more than 8;

(11) The powder coating according to Clause 4, wherein the suffix i is an integer of from not less than 1 to not more than 100;

(12) The powder coating according to Clause 5, wherein said organic polymer is an acrylic polymer;

(13) The powder coating according to Clause 5, wherein said organic polymer is a polyester polymer;

(14) The powder coating according to Clause 5, wherein said organic polymer comprises a saturated hydrocarbon polymer and/or hydrocarbon chain;

(15) The powder coating according to any one of Clauses 2 to 4, wherein said Si—H group-containing curing agent is methylphenylhydrogenpolysiloxane;

(16) The powder coating according to any one of Clauses 1 to 15, wherein said alkenyl group constituting said alkenyl group-containing polyester resin is represented by formula (6):

(6)

wherein $R^4$ represents a C$_{1-20}$ divalent organic group; $R^5$ represents a hydrogen atom, a methyl group or an ethyl group; and $R^6$ represents a hydrogen atom or methyl group;

(17) The powder coating according to any one of Clauses 1 to 16, wherein said alkenyl group-containing polyester resin has a glass transition temperature of from 0° C. to 100° C.;

(18) The powder coating according to any one of Clauses 1 to 17, wherein said polyester resin composition has a glass transition temperature of from 0° C. to 100° C.

DETAILED DESCRIPTION OF THE INVENTION

As the alkenyl group-containing polyester resin to be used as the component (A) constituting the polyester resin composition defined as a main component of the powder coating of the present invention in Clause (1), there may be used a known or unknown polyester resin containing at least 1.2 alkenyl groups on the average per molecule and having a number-average molecular weight of from 500 to 100,000. As the foregoing alkenyl group, there may be used an organic group having any structure containing a carbon-carbon double bond which can undergo hydrosilylation reaction with Si—H group in the curing agent. The carbon-carbon double bond is preferably present at or adjacent to the end of the molecule in the light of reactivity with the curing agent. In some detail, the alkenyl group preferably has a structure represented by formula (6):

(6)

wherein $R^4$ represents a C$_{1-20}$ divalent organic group; $R^5$ represents a hydrogen atom, a methyl group or an ethyl group; and $R^6$ represents a hydrogen atom or a methyl group. In the foregoing formula (6), $R^4$ is a divalent organic group having from 1 to 20 carbon atoms. The divalent organic group may comprise hydrogen, oxygen, nitrogen, silicon, phosphorus, sulfur, halogen, etc. incorporated therein as constituent elements besides carbon so far as they don't inhibit hydrosilylation reaction with the curing agent. $R^5$ may be any one of hydrogen atom, methyl group and ethyl group, preferably hydrogen atom or methyl group in the light of reactivity with the curing agent. $R^6$ may be any one of hydrogen atom and methyl group, preferably hydrogen atom in the light of reactivity with the curing agent. Specific examples of the structure represented by the foregoing formula (6) will be given below.

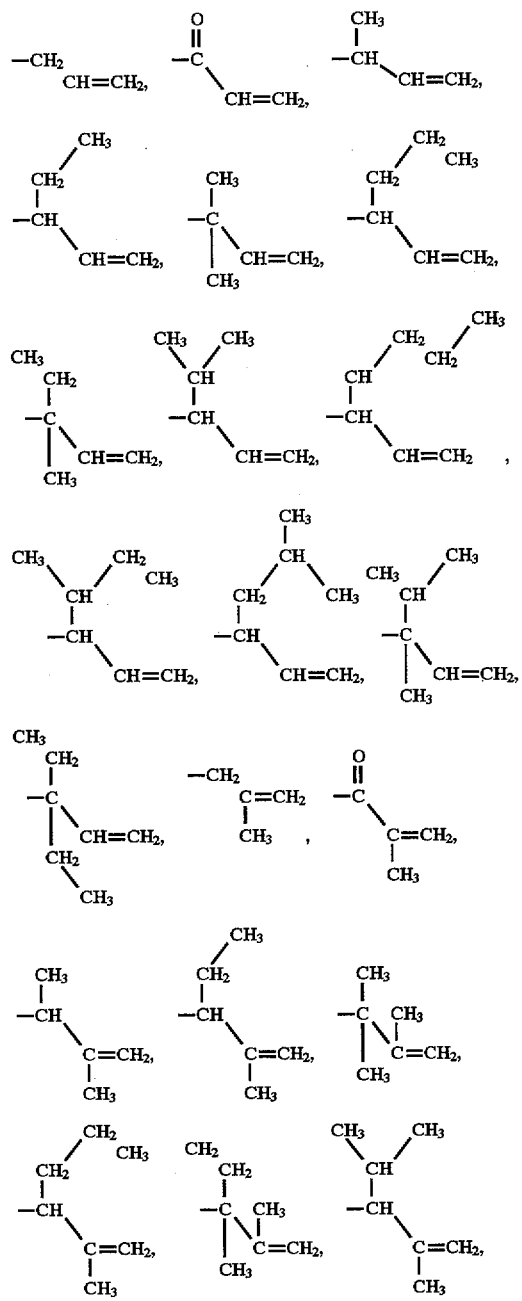

-continued

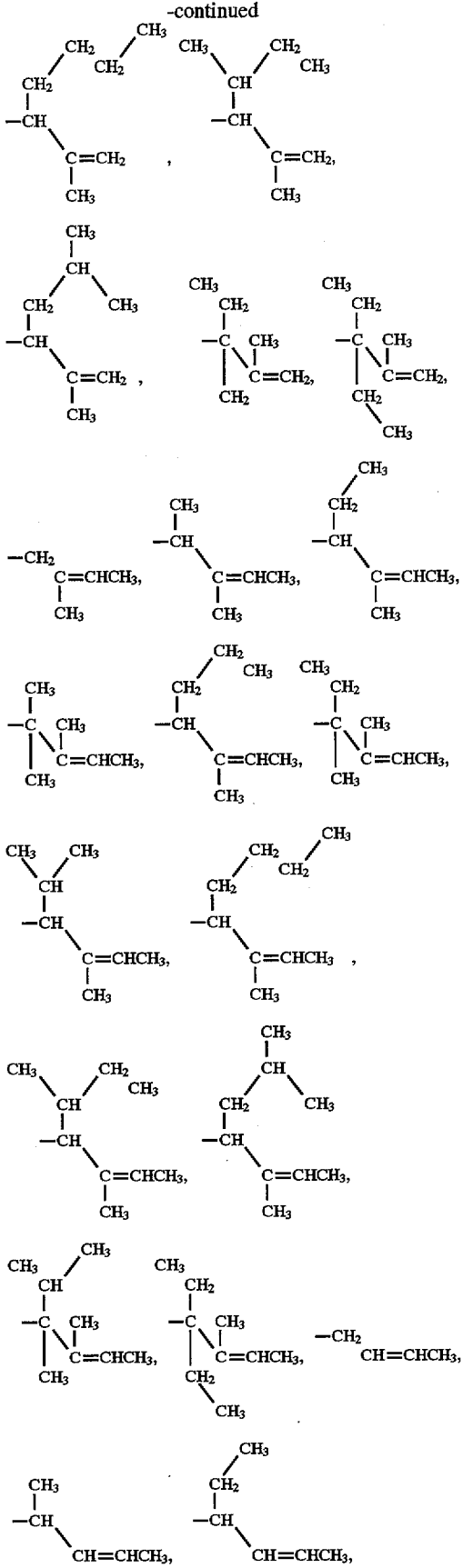

-continued
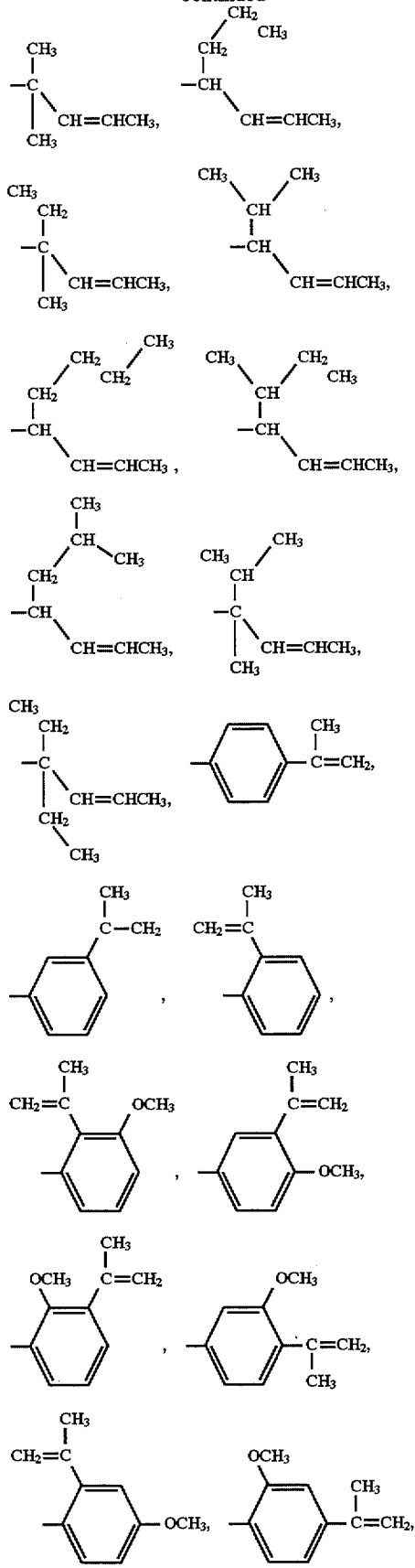
-continued
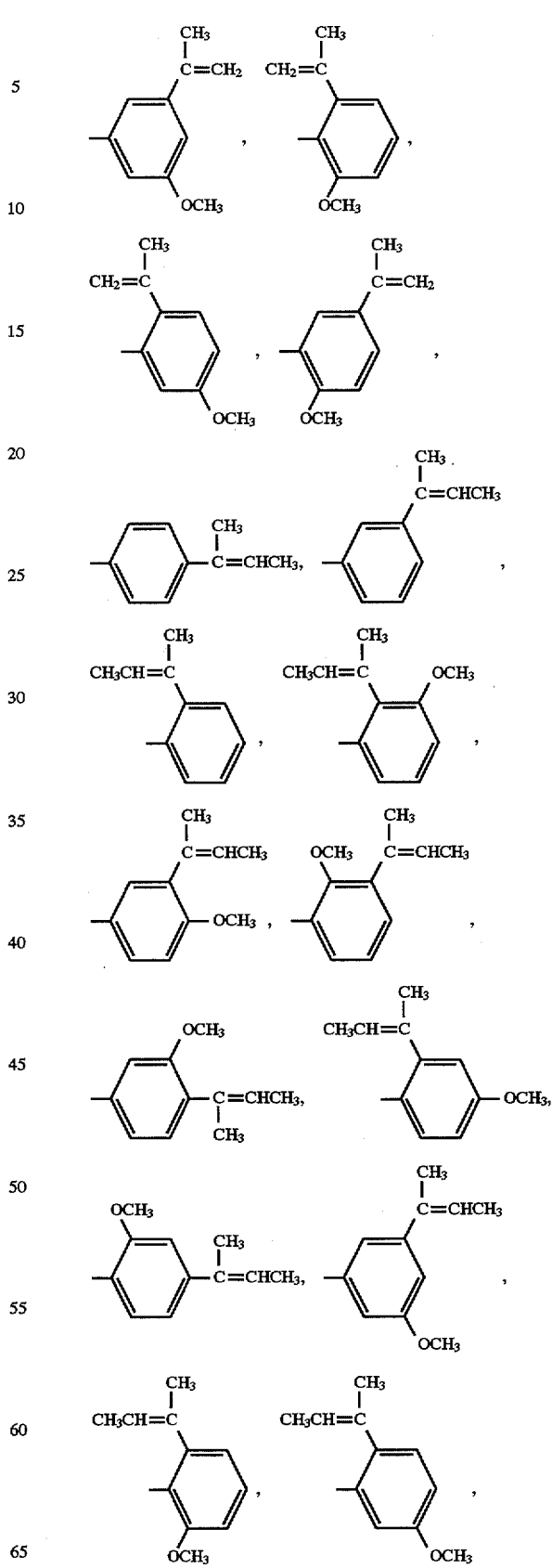

-continued
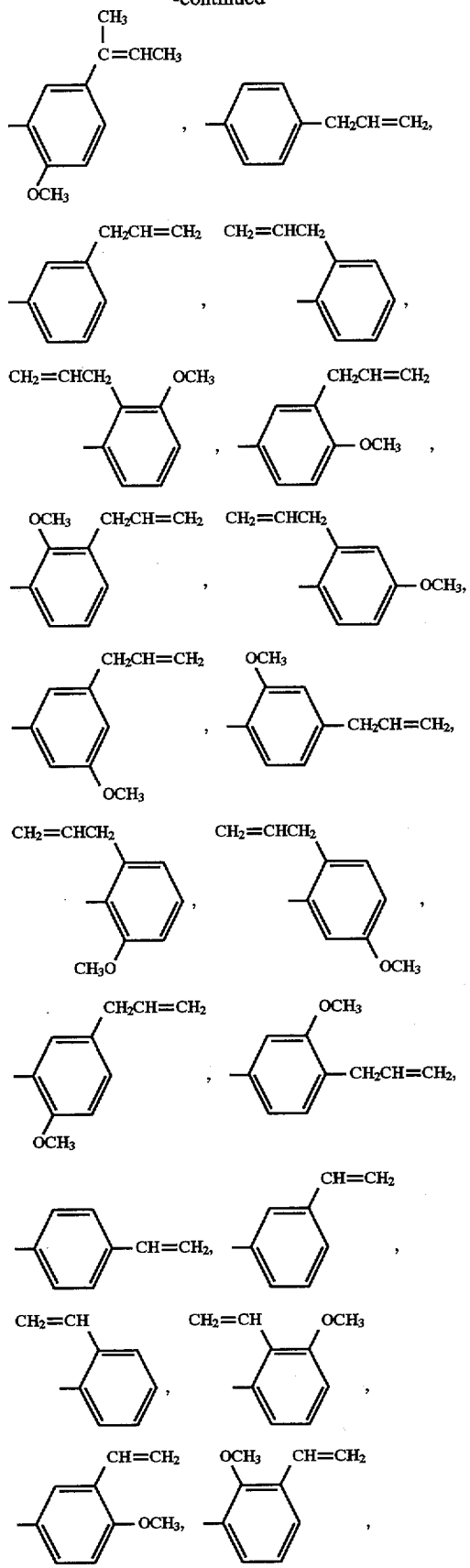
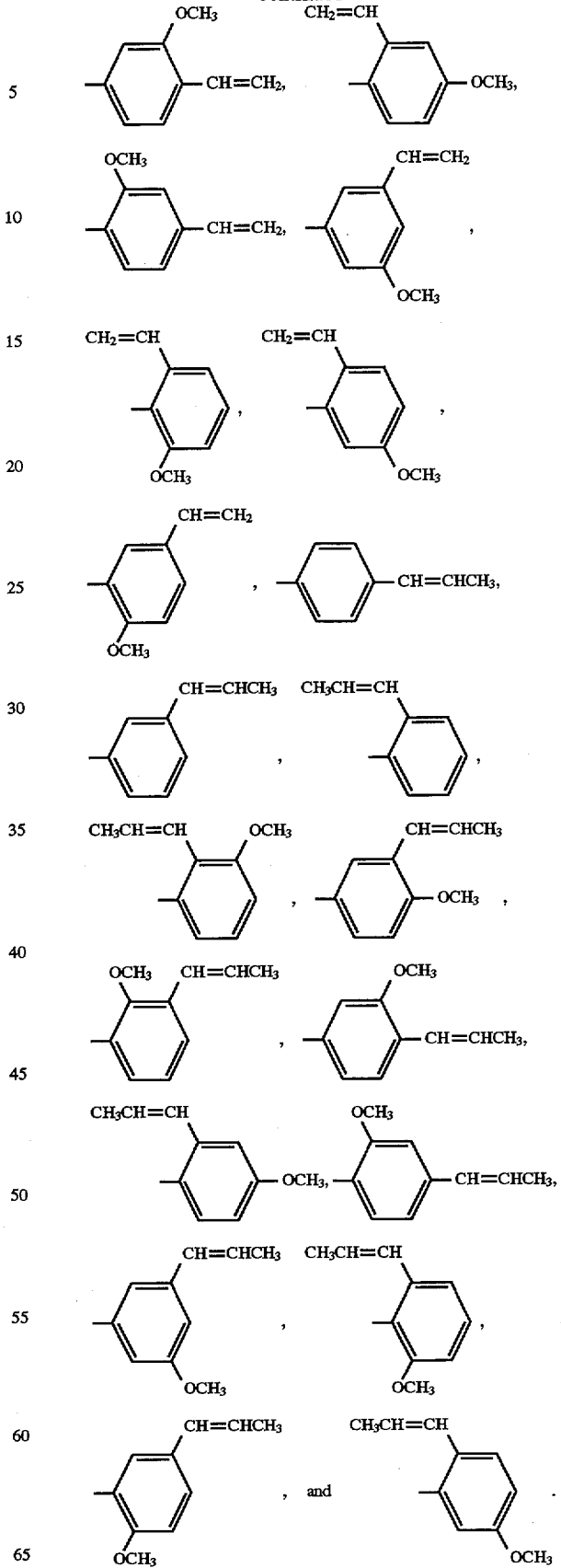

Preferred among these structures are the following structures in the light of reactivity with the curing agent.

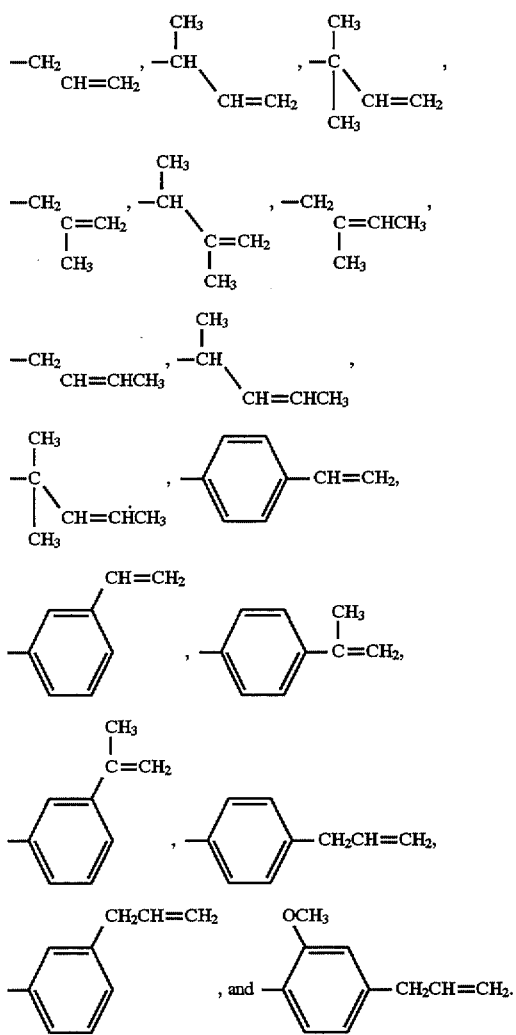

The structure represented by the formula (6) may be present at the end of the main chain or side chain of the polyester resin as a moiety. The alkenyl group in the structure represented by the formula (6) may be bonded to the main chain or side chain of the polyester resin via an atom having a valence of 2 or more selected from the group consisting of carbon, oxygen, nitrogen, silicon, phosphorus, sulfur, titanium, aluminum and boron. In some detail, the alkenyl group in the structure represented by the formula (6) may be bonded to the main chain or side chain of the polyester resin via a bonding group such as

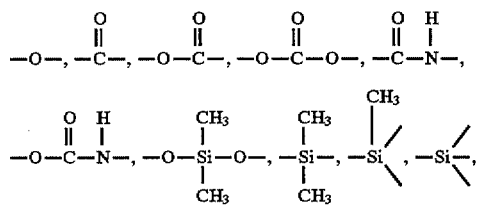

-continued

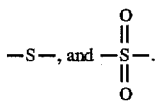

In order to render the powder coating of the present invention curable, the number of alkenyl groups to be present in the polyester resin is on the average per molecule at least 1.2, preferably from not less than 1.2 to not more than 10 in the light of curability, more preferably from not less than 1.5 to not more than 5 in the light of mechanical properties. The alkenyl group is preferably present at the end of the main chain or side chain of the polyester resin. In the light of the mechanical properties of the cured coat, the alkenyl group is preferably present at the end of the skeleton of the main chain of the polyester resin. In the light of curing speed, the alkenyl group is preferably present in the side chain of the polyester resin. Thus, the alkenyl group may be present in the skeleton of the main chain and in the side chain in a proper proportion to obtain a powder coating having desired properties. The number-average molecular weight of the polyester resin is from 500 to 100,000 as calculated in terms of standard polystyrene determined by gel permeation chromatography (hereinafter referred to as "GPC"). If the number-average molecular weight of the polyester resin falls below 500, the resulting polyester resin has too low a content of the polyester structure to exhibit desired properties as polyester resin. If the number-average molecular weight of the polyester resin exceeds 100,000, the curing agent's crosslinking effect becomes indefinite. In the light of fluidity of the powder coating during heat melting before crosslinking, the number-average molecular weight of the polyester resin is preferably from 500 to 20,000. In order to provide the polyester resin composition with a melt viscosity suitable for application to powder coating, the polyester resin composition preferably has a glass transition temperature of from 0° C. to 100° C.

The preparation of the alkenyl group-containing polyester resin can be accomplished by either a known method or an unknown method. Examples of the known method employable herein include those disclosed in JP-A-51-142027, JP-A-2-251509, JP-A-3-115415, JP-A-3-258820, JP-A-3-258821, JP-A-3-277645, JP-A-4-77513, and JP-A-4-146919. In some detail, a product of the polycondensation of a polyvalent alcohol with a polybasic acid or anhydride thereof wherein an alkenyl group-containing monoalcohol or polyvalent alcohol is used as a part of the alcohol component or a product of the polycondensation reaction of a polyvalent alcohol with a polybasic acid or anhydride thereof and an acid containing alkenyl group or anhydride thereof can be used. Alternatively, a product of the condensation reaction of a carboxyl acid-terminated polyester obtained by the polycondensation reaction of a polyvalent alcohol with a polybasic acid or anhydride thereof with an alcohol containing alkenyl group, a product of the ester interchange reaction of a carboxylic acid-terminated polyester with an ester of an alcohol containing alkenyl group, a product of the condensation reaction of a hydroxyl group-terminated polyester obtained by the polycondensation reaction of a polyvalent alcohol with a polybasic acid or anhydride thereof with an acid containing alkenyl group or anhydride thereof, or a product of the ester interchange reaction of a hydroxyl group-terminated polyester with an ester of an acid containing alkenyl group may be used. Further, a product of the addition reaction of a carboxylic acid-terminated polyester with an epoxy compound containing alkenyl group may be used. Moreover, a product of the addition reaction of hydroxyl group-terminated polyester with an isocyanate compound containing alkenyl group may be used.

Representative examples of the foregoing polyvalent alcohol include ethylene glycol, propylene glycol, diethylene glycol, 1,3-butanediol, 1,4-butanediol, neopentanediol, isopentyl glycol, 1,6-hexanediol, glycerol, trimethylolethane, trimethylolpropane, erythritol, pentaerythritol, and cyclohexanediol. The foregoing polyvalent carboxylic acid may comprise terephthalic acid and/or isophthalic acid as a main component, optionally with other polyvalent carboxylic acids such phthalic acid, methylphthalic acid, 2,6-naphthalenedicarboxylic acid, tetrahydrophthalic acid, methyltetrahydrophthalicacid (e.g.,4-methyltetrahydrophthalic acid), aromatic dicarboxylic acid (e.g., 4,4'-diphenyldicarboxylic acid), aromatic carboxylic acid having a valence of not less than 3 (e.g., trimellitic acid (if used in a small amount), pyromellitic acid, hemimellitic acid, benzophenone-3,3',4,4'-tetracarboxylic acid), aliphatic dicarboxylic acid (e.g., succinic acid, adipic acid, glutaric acid, pimelic acid, suberic acid, azelaic acid, sebacic acid, fumaric acid, maleic acid), alicyclic dicarboxylic acid (e.g., 1,4-cyclohexanedicarboxylic acid), aliphatic tricarboxylic acid (e.g., 1,2,3-propanetricarboxylic acid) or alicyclic tricarboxylic acid (e.g., 6-methylcyclohexene-4-ene-1,2,3-tricarboxylic acid) incorporated therein.

Specific examples of the foregoing monoalcohol containing alkenyl group include vinyl alcohol, allyl alcohol, 3-butene-1-ol, 4-pentene-1-ol, 5-hexene-1-ol, 6-heptene-1-ol, 7-octene-1-ol, 8-nonene-1-ol, 9-decene-1-ol, 2-(allyloxy) ethanol, neopentyl glycol monoallyl ether, glycerin diallyl ether, trimethylol propane diallyl ether, trimethylol ethane diallyl ether, pentaerythritol triallyl ether, 1,2,6-hexanetriol diallyl ether, sorbitan diallyl ether, and the following compounds:

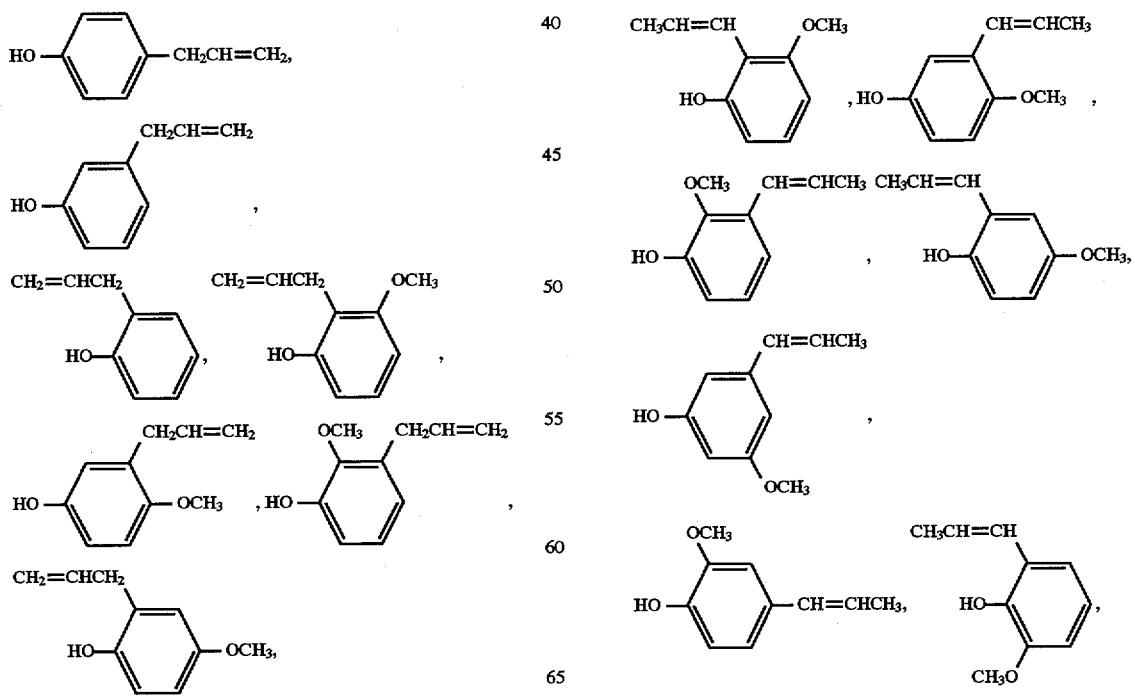

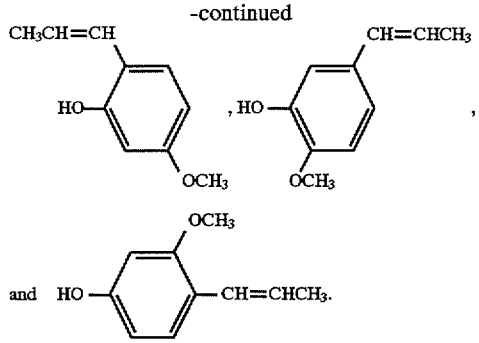

Particularly preferred among these monoalcohols are allyl alcohol, vinyl alcohol, 3-butene-1-ol, 2-(allyloxy)ethanol, and the following compounds:

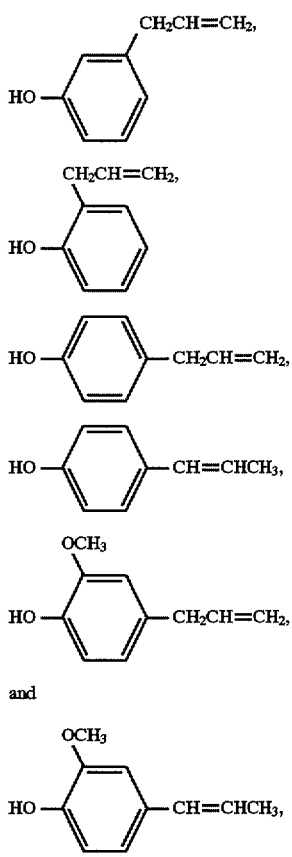

in the light of availability.

Specific examples of the foregoing polyvalent alcohol containing alkenyl group include glycerin monoallyl ether, trimethylol propane monoallyl ether, trimethylol ethane monoallyl ether, pentaerythritol monoallyl ether, 1,2,6-hexanetriol monoallyl ether and sorbitan monoallyl ether.

Specific examples of the foregoing acid containing alkenyl group include allylacetic acid, acrylic acid, methacrylic acid, 2-butenoic acid, and 3-butenoic acid. Preferred among these acids is allylacetic acid in the light of activity in hydrosilylation reaction.

Specific examples of the foregoing acid anhydride containing alkenyl group include itaconic anhydride, and maleic anhydride. Preferred among these acid anhydrides is itaconic anhydride in the light of activity in hydrosilylation reaction.

Specific examples of the foregoing epoxy compound containing alkenyl group include the following compounds:

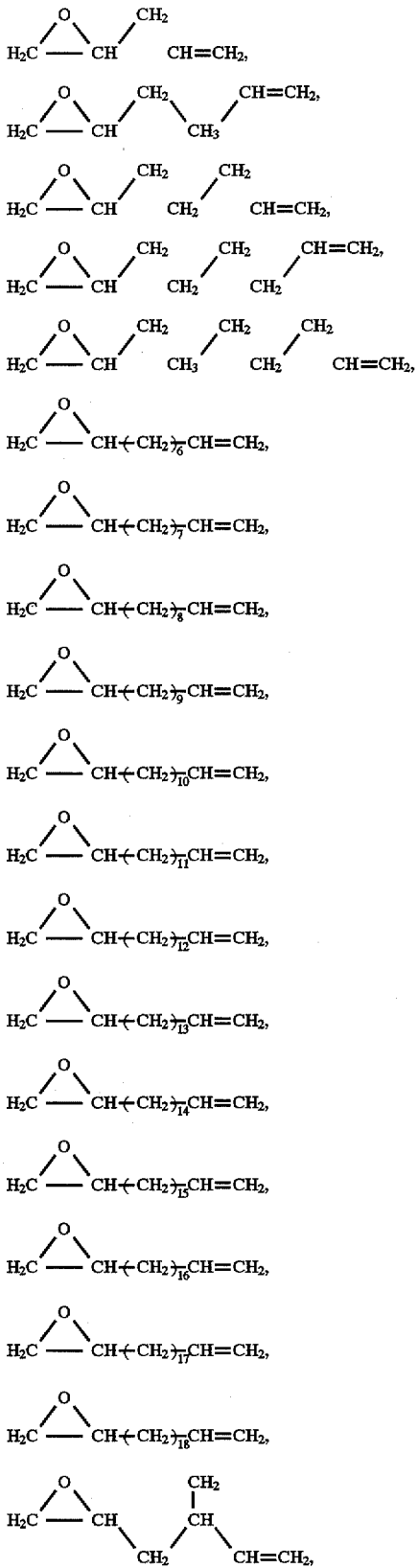

-continued

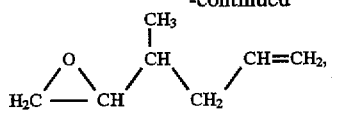
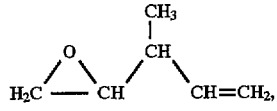
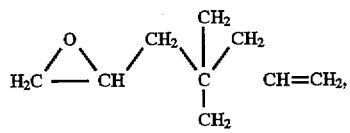
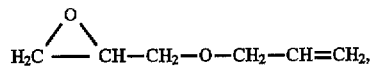
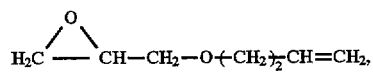
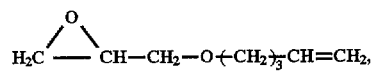
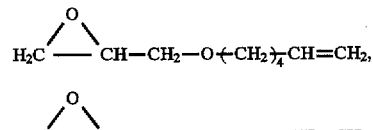
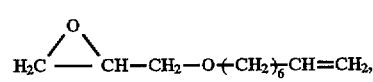
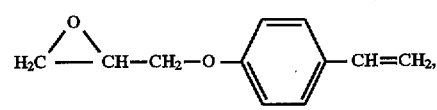
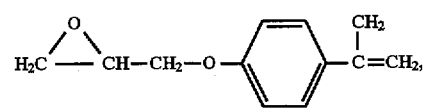
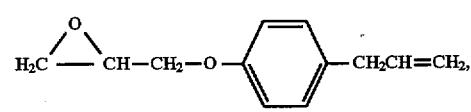
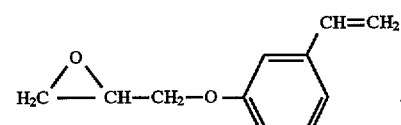
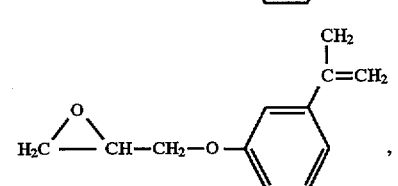
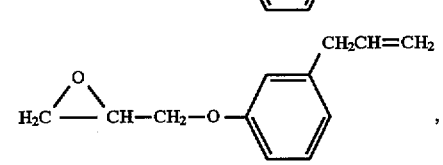

-continued

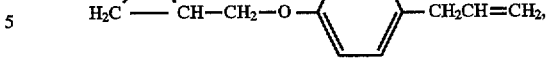

and

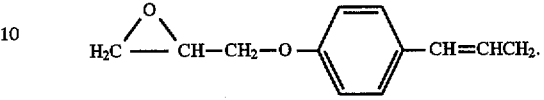

particularly preferred among these epoxy compounds are allyl glycidyl ether, and the following compounds:

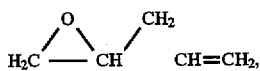
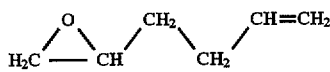
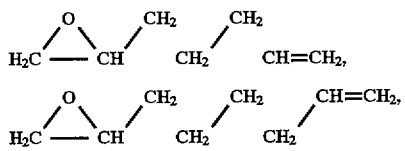
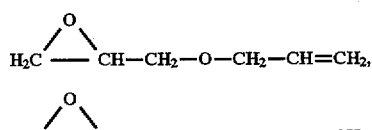
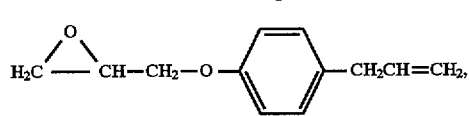

and

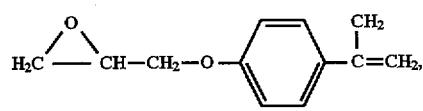

in the light of activity in hydrosilylation reaction and availability.

Specific examples of the foregoing isocyanate compound containing alkenyl group include allyl isocyanate, (meth) acryloyl isocyanate, 2-isocyanate ethyl (meth)acrylate. Preferred among these isocyanate compounds is allyl isocyanate in the light of activity in hydrosilylation reaction and availability.

The alkenyl group-containing polyester to be used in the present invention preferably contains a functional group which undergoes side reaction such as condensation reaction with Si—H group contained in the curing agent in an amount as small as possible. Examples of such an undesirable functional group include carboxylic acid group, sulfonic acid group, primary hydroxyl group, phenolic hydroxyl group, and primary and secondary amino groups. The functional group which undergoes undesirable side reaction is preferably contained in an amount of not more than 1, more preferably not more than 0.5 molecules on the average per molecule of polyester resin. Further, another possible effect developed by the reduction of the content of the foregoing functional group, particularly carboxylic acid group or primary hydroxyl group, is that the resulting alkenyl group-containing polyester resin has a lower melt viscosity than the carboxylic acid-terminated polyester resin or hydroxyl group-terminated polyester resin which has heretofore been used for polyester powder coating. Therefore, the content of the carboxylic acid or primary hydroxyl group is preferably not more than 0.2 molecules on the average per molecule of polyester resin.

The Si—H group-containing curing agent as the component (B) constituting the polyester resin composition to be used as the main component of the powder coating of the present invention is a Si—H group-containing curing agent having at least two Si—H groups per molecule. The Si—H group-containing curing agent undergoes hydrosilylation with the alkenyl group in the alkenyl group-containing polyester to crosslink the alkenyl group-containing polyester.

As the Si—H curing agent having at least two Si—H groups as the component (B) constituting the novel polyester curable composition of the present invention, there may be used a Si—H compound having any structure. The structure of the Si—H compound which can be used as Si—H curing agent is not limited. An organic group-modified hydrogen polysiloxane represented by the following formula (7), (8) or (9) is preferred from the standpoint of compatibility with the alkenyl group-containing polyester resin as the component (A) constituting the polyester resin composition of the present invention.

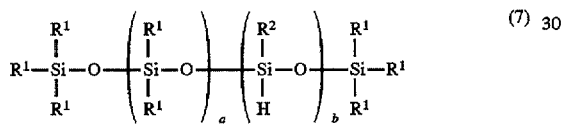

(7)

wherein $R^1$ and $R^2$ each represent a $C_{1-7}$ alkyl or phenyl group a; represents an integer of from not less than 0 to not more than 100 ($0 \leq a \leq 100$); and b represents an integer of from not less than 2 to not more than 100 ($2 \leq b \leq 100$);

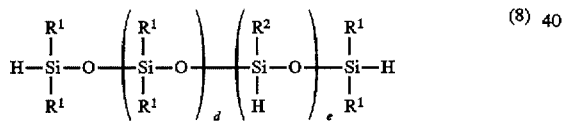

(8)

wherein $R^1$ and $R^2$ are as defined above; d represents an integer of from not less than 0 to not more than 100 ($0 \leq d \leq 100$); and e represents an integer of from not less than 2 to not more than 100 ($2 \leq e \leq 100$); and

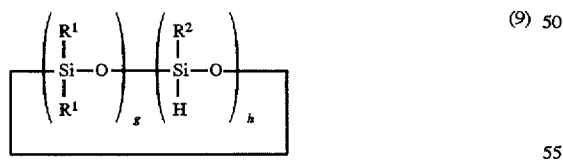

(9)

wherein $R^1$ and $R^2$ are as defined above; g represents an integer of from not less than 0 to not more than 8 ($0 \leq g \leq 8$); and h represents an integer of from not less than 2 to not more than 10 ($2 \leq h \leq 10$), with the proviso that g and h satisfy the relationship $3 \leq g+h \leq 10$.

In the foregoing formulae (7) to (9), the proportion of the siloxane unit represented by formula:

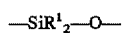

wherein $R^1$ is as defined above is larger, these organic group-modified hydrogen polysiloxanes exhibit more excellent compatibility with the alkenyl group-containing polyester resin as the component (A) constituting the polyester resin composition of the present invention.

As the $C_{1-7}$ alkyl group represented by $R^1$, $R^2$ or $R^3$, there may be used methyl group, ethyl group, propyl group, butyl group or the like. Particularly preferred among these groups are methyl group and propyl group from the industrial standpoint of view. The polymerization degree of the polysiloxane is defined by the suffixes a to i. A siloxane having a greater polymerization degree than specified above has a raised viscosity and hence a poor workability and exhibits a reduced compatibility with the alkenyl group-containing polyester. In order to enhance the compatibility with the alkenyl group-containing polyester, a siloxane containing a phenyl group as an organic group is preferred. Specific examples of such a siloxane group include the following compounds:

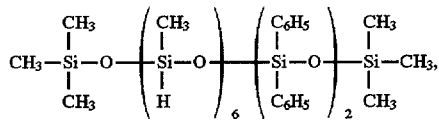

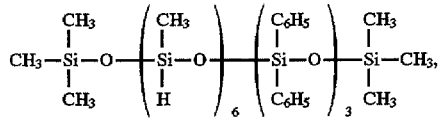

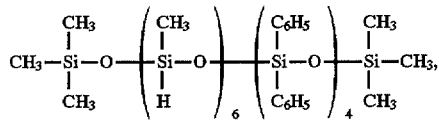

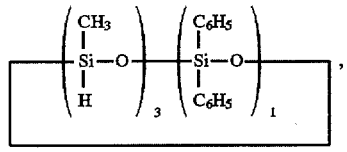

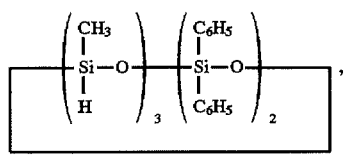

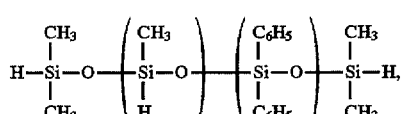

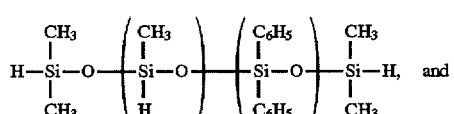 and

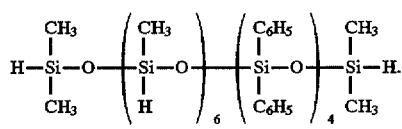

Such a hydrogen polysiloxane may contain at least one high molecular organic group having a molecular weight of not less than 100 (hereinafter referred to as "high molecular chain") per molecule to drastically enhance its compatibility with the polyester resin as a main component. The resulting powder coating can exhibit remarkable enhancement in powder properties. The effective molecular amount of the high molecular chain is not less than 100, preferably from 300 to 5,000, more preferably from 500 to 4,000. As the organic group which can be bonded to the hydrogen polysiloxane as a high molecular chain (hereinafter referred to as "high molecular polymer"), there may be used a high molecular polymer containing a monofunctional, bifunctional or trifunctional substituent active to Si—H group. Examples of the functional group active to Si—H group include substituents such as alkenyl group, hydroxyl group and carboxylic acid. Preferred among these substituents is alkenyl group. However, the present invention is not limited to the foregoing functional groups so far as the functional groups used have reaction activity. If the high molecular polymer is monofunctional, an organic-modified hydrogen polysiloxane of the type having a high molecular chain grafted on hydrogen polysiloxane as represented by the following formula (1)', (2)' or (3)' can be obtained.

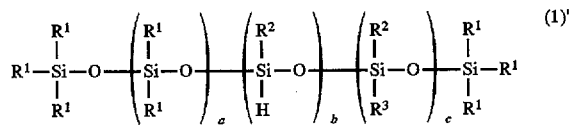

(1)' wherein $R^1$ and $R^2$ each represent a $C_{1-7}$ alkyl group or a phenyl group; $R^3$ represents an organic group having a molecular weight of not less than 100; a represents an integer of from not less than 0 to not more than 100; b represents an integer of from not less than 2 to not more than 100; and c represents an integer of from not less than 1 to not more than 100;

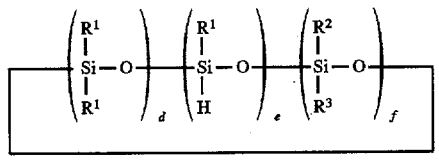

(2)' wherein $R^1$, $R^2$ and $R^3$ are as defined above; d represents an integer of from not less than 0 to not more than 8; e represents an integer of from not less than 2 to not more than 10; and f represents an integer of from not less than 1 to not more than 8, with the proviso that d, e and f satisfy the relationship $3 \leq d+e+f \leq 10$; and

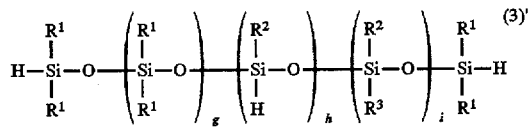

(3)' wherein $R^1$, $R^2$ and $R^3$ are as defined above; g represents an integer of from not less than 0 to not more than 100; h represents an integer of from not less than 2 to not more than 100; and i represents an integer of from not less than 1 to not more than 100.

If the high molecular polymer is bifunctional or trifunctional with respect to Si—H group, its structure is preferred such that the hydrogen polysiloxane having a structure represented by the following formula (4) and/or (5) is bonded to the high molecular polymer via a bonding group X. As the composition of the hydrogen polysiloxane to be used, there may be used a composition mixture of hydrogen polysiloxanes having structures represented by the following formulae (4) and (5). More preferably, a chain hydrogen polysiloxane represented by the following formula (4) or a cyclic hydrogen polysiloxane represented by the following formula (5) may be used singly.

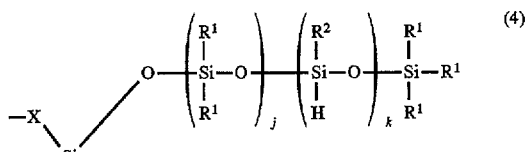

(4)

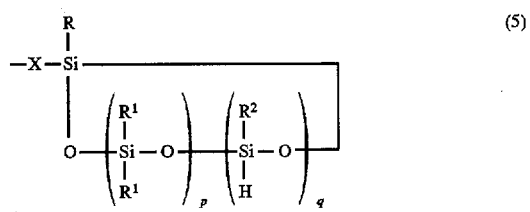

(5)

wherein $R^1$ and $R^2$ are as defined above; j, k, m and n each represent 0 or a positive integer, with the proviso that j, k, m and n satisfy the relationships $0 \leq j+m \leq 100$ and $1 \leq k+n \leq 100$; p represents an integer of from not less than 0 to not more than 8; q represents an integer of from not less than 1 to not more than 10, with the proviso that p and q satisfy the relationship $3 \leq p+q \leq 10$; X represents a divalent bonding group such as —O—, —COO— and —CH$_2$CH$_2$—; and R represents a monovalent substituent selected from the group consisting of H, OSi(CH$_3$)$_3$ and $C_{1-10}$ organic group.

As the organic group to be bonded to the hydrogen polysiloxane as the foregoing high molecular polymer, there may be simply and usefully employed an organic polymer such as polyester polymer, acrylic polymer and hydrocarbon polymer. Alternatively, an unsaturated hydrocarbon compound such as 1-octene, 1-nonene, 1-decene, 1-dodecene, 1,8-octadiene and 1,10-decadiene, aromatic hydrocarbon containing allyl group or allyloloxy group such as allyl benzene, 1-allyl-4-methoxybenzene and naphthalene group having allyloxy group in α- or β-position, bisphenol derivative having allyl group or allyloxy group such as 2,2-bis(4-allyloxyphenyl) propane, etc. can be used.

In order to introduce alkenyl group into the organic polymer (a high molecular polymer to be introduced into hydrogen polysiloxyane as a high molecular chain), a method can be employed which comprises the introduction of alkenyl group into the polyester resin as the component (A) constituting the polyester composition of the present invention. In some detail, an alkenyl group-containing organic compound reactive with a functional group such as hydroxyl group, glycidyl group, alkoxyl group and carboxyl group contained in the organic polymer may be reacted with the organic polymer to introduce alkenyl group into the organic polymer at the end thereof or in the main chain thereof.

Specific examples of the carboxylic acid as the foregoing reactive functional group include $C_{3-20}$ unsaturated aliphatic acid such as acrylic acid, methacrylic acid, vinylacetic acid, allylacetic acid, 2-butenoic acid and 3-butenoic acid. Preferred among these carboxylic acids are allylacetic acid and vinylacetic acid in the light of activity in hydrosilylation reaction.

Specific examples of the acid halide as the foregoing reactive functional group include acryl chloride, and acrylic bromide.

Specific examples of the carboxylic anhydride as the foregoing reactive functional group include itaconic anhydride, and maleic anhydride.

Specific examples of the carbonic halide as the foregoing reactive functional group include $C_{3-20}$ unsaturated aliphatic acid-substituted carbonic halide such as allylchloroformate ($CH_2=CHCH_2OCOCl$), and allylbromoformate ($CH_2=CHCH_2OCOBr$).

Specific examples of the epoxy group as the foregoing reactive functional group include the following compounds:

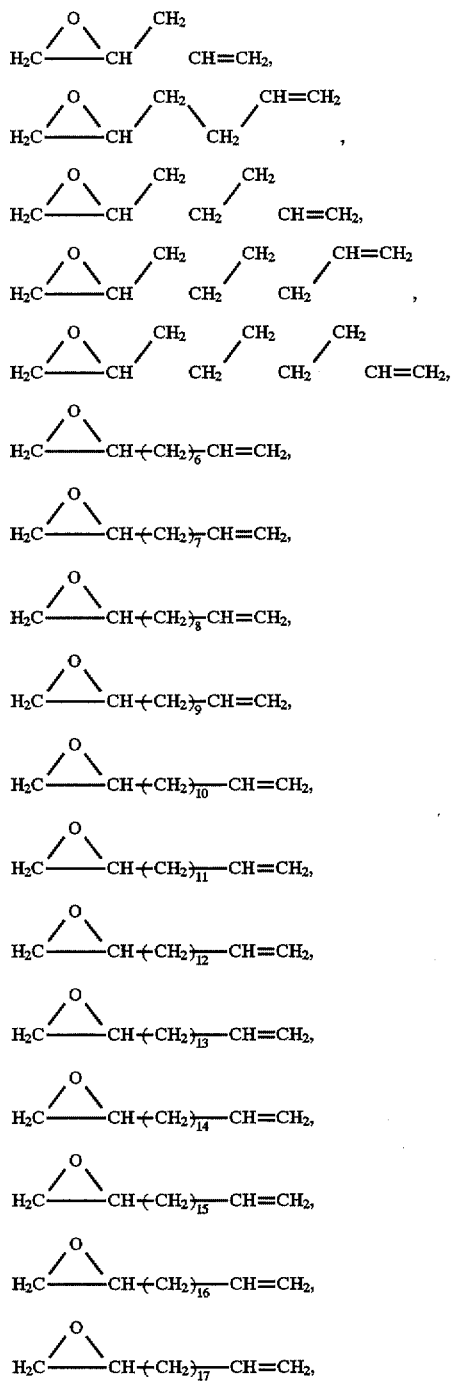
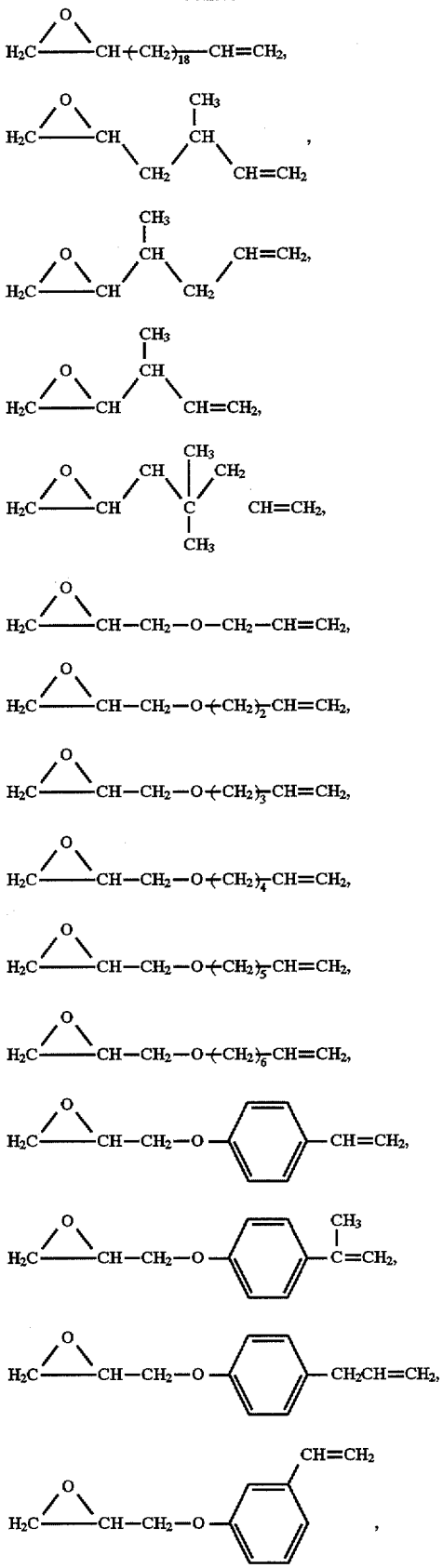

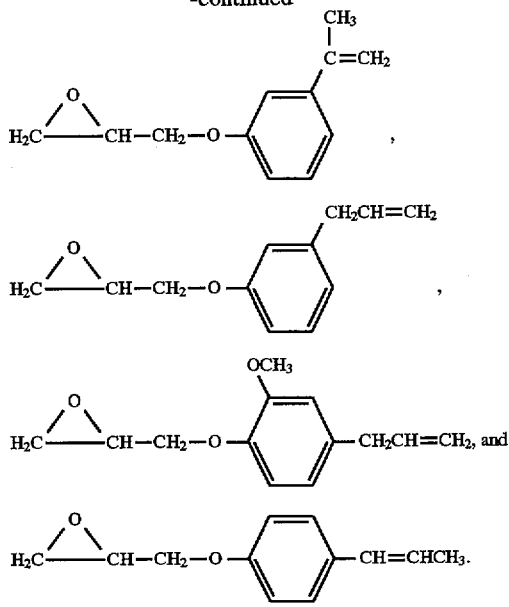

Particularly preferred among these epoxy groups is allyl glycidyl ether:

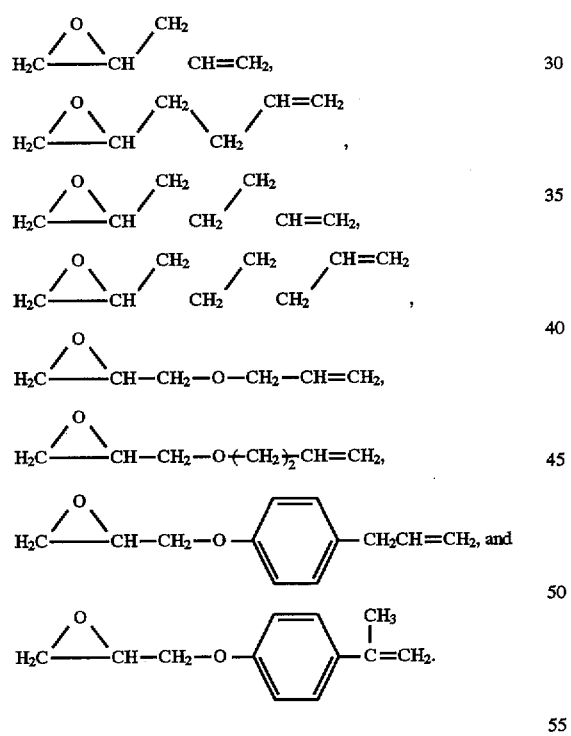

in the light of activity in hydrosilylation reaction and availability.

Specific examples of the isocyanate group as the foregoing reactive functional group include allyl isocyanate, (meth)acryloyl isocyanate, and 2-isocyanate ethyl (meth)acrylate. Particularly preferred among these isocyanate groups is allyl isocyanate in the light of activity in hydrosilylation reaction and availability.

Specific examples of the hydroxyl group as the foregoing reactive functional group include vinyl alcohol, allyl alcohol, 3-butene-1-ol, 4-pentene-1-ol, 5-hexene-1-ol, 6-heptene-1-ol, 7-octene-1-ol, 8-nonene-1-ol, 9-decene-1-ol, 2-(allyloxy)ethanol, neopentyl glycol monoallyl ether, glycerin diallyl ether, trimethylol propane diallyl ether, trimethylol ethane diallyl ether, pentaerythritol triallyl ether, 1,2,6-hexanetriol diallyl ether, sorbitan diallyl ether, and the following compounds:

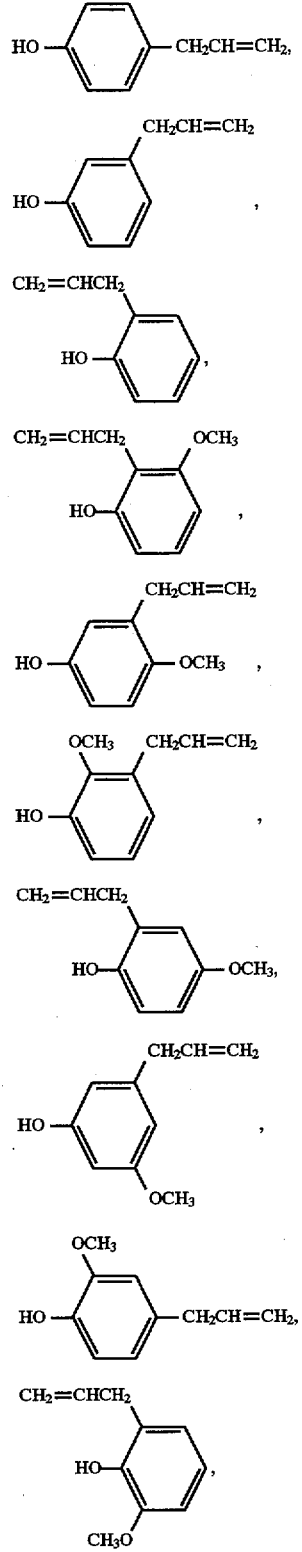

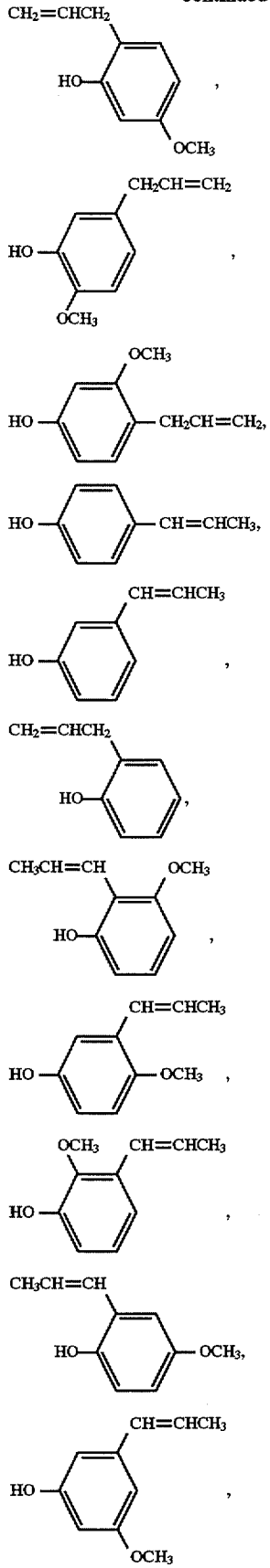
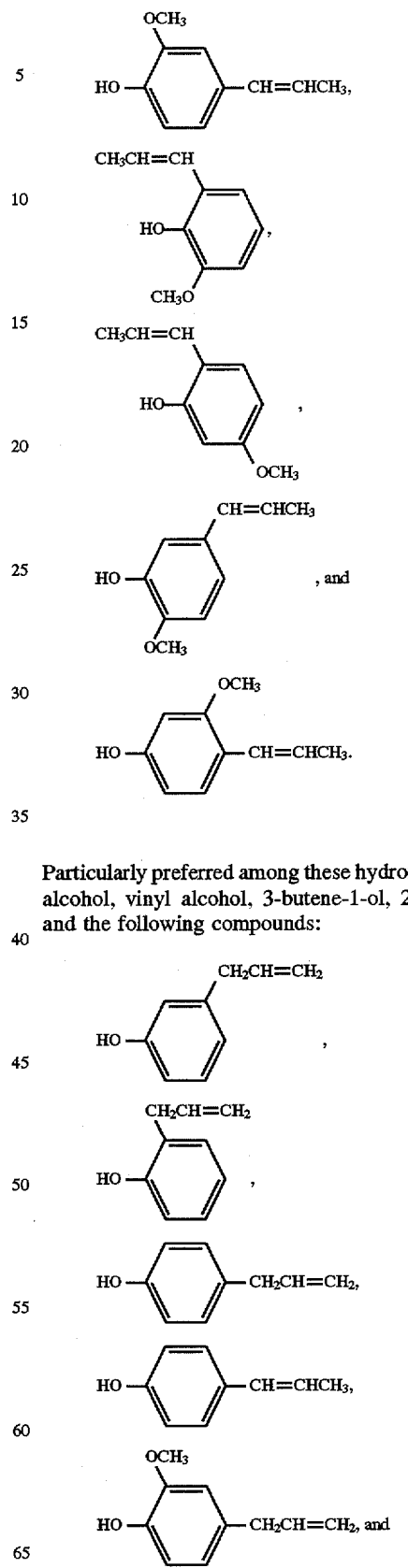
Particularly preferred among these hydroxyl groups are allyl alcohol, vinyl alcohol, 3-butene-1-ol, 2-(allyloxy)ethanol, and the following compounds:

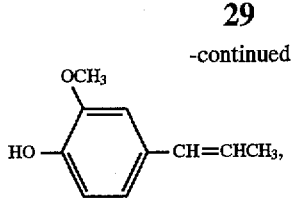

in the light of availability.

Further examples of the hydroxyl group include compounds such as allyl bromide, vinyl(chloromethyl)benzene, allyl(chloromethyl)benzene, allyl(bromomethyl)benzene, allyl (chloromethyl)ether, allyl(chloromethoxy)benzene, 1-butenyl (chloromethyl)ether, 1-hexenyl(chloromethoxy) benzene and allyloxy(chloromethyl)benzene.

In addition, as the method of introducing alkenyl group into the high molecular polymer, the following methods can be enumerated.

(1) In the case of the preparation of the acrylic resin by a radical polymerization method, alkenyl group can be introduced into the polymer molecule by using, as the monomer component, a monomer containing alkenyl group having a relatively low radical polymerizability such as allyl acrylate, allyl methacrylate and allyloxyethyl methacrylate. Further, alkenyl group can be introduced into the polymer molecule at the end thereof by using a chain transfer agent containing alkenyl group having a relatively low radical polymerizability such as ally mercaptan at the time of radical polymerization.

(2) A method can be employed which comprises the introduction of alkenyl group into the acrylic resin, which had been produced by a radical polymerization, an anionic polymerization and the like, in accordance with an ester interchanging method. This alkenyl-introducing method is a method of replacing the alkoxy group in the (meth) acrylic ester moiety as a monomer unit of the acrylic resin with an alkenyl group- containing alcohol or alkenyl group-containing phenol compound by using an ester interchanging catalyst. The alkenyl group-containing alcohol or alkenyl group-containing phenol compound, which is used for such an interchange of alkoxy group, may be an alcohol or phenol derivative having at least one alkenyl group and at least one hydroxyl group, preferably one hydroxyl group. Also, an acrylic monomer component, which is not ester interchangeable, other than ester bond may be present or not in the molecule, thereby resulting in no problem. The use of the catalyst is optional, but titanium or tin catalyst is preferred.

(3) In the case of the preparation of the acrylic resin by an anionic polymerization, alkenyl group can be introduced into the acrylic resin at the end thereof by the addition of the halogen compound containing alkenyl group such as allyl bromide at the reaction stopping time.

The preparation of the polyester polymer to be bonded to the hydrogen polysiloxane as the foregoing high molecular polymer can be accomplished by subjecting the main skeleton constituting the polymer, e.g., polybasic acid and polyvalent alcohol to polycondensation by direct esterification method, ester interchange method or the like. However, the present invention is not limited to these methods.

(Divalent alcohol)

Ethylene glycol, propylene glycol, butanediol, hexamethylene glycol, hydrogenated bisphenol A, neopentyl glycol, polybutadiene diol, diethylene glycol, triethylene glycol, and dipropylene glycol (Trivalent alcohol)

Glycerin, trimethylolmethane, trimethylolpropane, and pentaerythritol (Divalent carboxylic acid)

Phthalic acid, isophthalic acid, terephthalic acid, tetrahydrophthalic acid, hexahydrophthalic acid, tetrachlorophthalic acid, polybutanedienedicarboxylic acid, oxalic acid, malonic acid, succinic acid, adipic acid, sebacic acid, maleic acid, fumaric acid, and cyclopentadicarboxylic acid (Polyvalent carboxylic acid having a valence of 3 or more)

Trimellitic acid, butanetricarboxylic acid, and pyromellitic acid

Further, the foregoing carboxylic anhydride, acyl halide, etc. can be used similarly to the polyvalent carboxylic acid. The main skeleton of the polymer can be prepared also by the ring opening polymerization of lactone. Examples of the lactone include β-propiolactone, pivalactone, α-methyl-β-propiolactone, δ-vallelolactone, methyl-δ-vallelolactone, dimethyl-δ-vallelolactone, ε-caprolactone, δ-methyl-ε-caprolactone, and dimethyl-ε-caprolactone.

The polyester polymer may be linear or branched.

Examples of the monomer component constituting the acrylic polymer to be bonded to the hydrogen polysiloxane as the foregoing high molecular polymer include acrylic acid or acrylic ester monomer such as methyl acrylate, ethyl acrylate, n-propyl acrylate, i-propyl acrylate, n-butyl acrylate, i-butyl acrylate, sec-butyl acrylate, t-butyl acrylate, 2-ethylhexyl acrylate, lauryl acrylate, tridecyl acrylate, stearyl acrylate, cyclohexyl acrylate, benzyl acrylate, tetrahydrofurfuryl acrylate, 2-hydroxyethyl acrylate, 2-hydroxypropyl acrylate, 2-methoxyethyl acrylate, 2-ethoxyethyl acrylate, 2-butoxyethyl acrylate, 2-phenoxyethyl acrylate, ethylcarbitol acrylate, allyl acrylate, glycidyl acrylate, dimethylaminoethyl acrylate, acrylic acid, sodium acrylate, trimethylolpropane acrylate, 1,4-butanediol diacrylate, 1,6-hexanediol acrylate, neopentylglycol diacrylate and pentaerythritol triacrylate and methacrylic acid or methacrylic ester monomer such as methyl methacrylate, ethyl methacrylate, butyl methacrylate, isobutyl methacrylate, t-butyl methacrylate, 2-ethylhexyl methacrylate, lauryl methacrylate, tridecyl methacrylate, stearyl methacrylate, cyclohexyl methacrylate, propyl methacrylate, benzyl methacrylate, isopropyl methacrylate, sec-butyl methacrylate, 2-hydroxyethyl methacrylate, 2-hydroxypropyl methacrylate, dimethylaminoethyl methacrylate, diethylaminoethyl methacrylate, glycidyl methacrylate, tetrahydrofurfuryl methacrylate, allyl methacrylate, ethylene glycol methacrylate, triethylene glycol methacrylate, tetraethylene glycol methacrylate, 1,3-butylene glycol methacrylate, trimethylol propane methacrylate, 2-ethoxyethyl methacrylate, 2-methoxyethyl methacrylate, dimethylaminoethylmethylchloride methacrylate, methacrylic acid and sodium methacrylate. In addition to these acrylic monomers, vinyl monomers such as acrylamide, acrylonitrile, vinyl acetate, styrene, ethylene, propylene, isobutylene, butadiene, isoprene and chloroprene may be used as copolymerizable components.

Examples of the monomer component constituting the hydrocarbon polymer to be bonded to the hydrogen polysiloxane as the foregoing high molecular polymer include $C_{2-12}$ olefins or acetylenes, conjugated dienes, vinylethers, and aromatic vinyl compounds. Specific examples of the monomer component include ethylene, acetylene, propylene, 1-butene, 2-butene, isobutylene, 2-methyl-1-butene, 3-methyl-1-butene, pentene, pentyne, 4-methyl-1-pentene, hexene, hexyne, vinyl cyclohexane, butadiene, isoprene, chloroprene, cyclopentadiene, methyl vinyl ether, ethyl vinyl ether, isobutyl vinyl ether, styrene, α-methylstyrene, dimethylstyrene, monochlorostyrene, dichlorostyrene, β-pinene, indene, and cyclopentadiene. Particularly preferred among these monomer components are propylene, 1-butene, 2-butene, isobutylene, butadiene, and isobutylene. The foregoing monomer components may be subjected to radical polymerization, ion polymerization, coordinated ion polymerization, living cation polymerization proposed by Kennedy et al. (so-called inifer method) or the like to obtain various saturated hydrocarbon polymers. If dienes and acetylenes are subjected to polymerization, double bonds are left in the main chain or side chain. This mechanism can be used to introduce hydrosilyl group into the polymer. When the resulting weather resistance is considered to be insufficient, the polymer may be hydrogenated.

Examples of the hydrocarbon polymer to be bonded to the hydrogen polysiloxane as the foregoing high molecular polymer include polyisobutylene, ethylene-propylene copolymer, 1,2-polybutadiene, polyisoprene, and hydrogenated polyisoprene. The present invention is not limited to these hydrocarbon polymers. These hydrocarbon polymers may be chain-like or branched.

In the combination of alkenyl group-containing polyester and Si—H group-containing curing agent, if the alkenyl group-containing polyester comprises not more than 2 molecules of alkenyl group on the average per molecule, the Si—H group-containing agent preferably comprises not less than 3 Si—H groups incorporated therein. On the contrary, if the alkenyl group-containing polyester comprises not less than 4 molecules of alkenyl group on the average per molecule, the curing agent preferably comprises not more than 10 Si—H groups incorporated therein. Further, if the alkenyl group-containing polyester comprises from 2 to 4 molecules of alkenyl group on the average per molecule, the curing agent preferably comprises from 3 to 8 Si—H groups incorporated therein.

The amount of the foregoing Si—H group-containing organic curing agent added is preferably such that Si—H groups are incorporated therein in an amount of from 0.7 to 4 molecules, particularly from 0.9 to 1.5 molecules per molecule of alkenyl group in the alkenyl group-containing polyester, in the light of curing speed. Such a proper adjustment of the amount of the Si—H group-containing organic curing agent added makes it possible to obtain a cured product having excellent weather resistance and flexibility.

If the content of Si—H groups falls below 0.7 molecules or exceeds 4 molecules per molecule of alkenyl group in the alkenyl group-containing polyester, the remaining alkenyl group or Si—H group reacts with moisture or contaminants, deteriorating the cured product. The resulting cured product can also be deteriorated when irradiated with ultraviolet rays.

Examples of the hydrosilylation catalyst as the component (C) constituting the polyester resin composition to be used as the main component of the powder coating of the present invention include platinum alone, catalyst having solid platinum supported on alumina, silica or carbon black, chloroplatinic acid, complex of chloroplatinic acid with alcohol, aldehyde, ketone or the like, platinum-olefin complex (e.g., $Pt(CH_2=CH_2)_2(PPh_3)_2$, $Pt(CH_2=CH_2)_2Cl_2$), platinum-vinylsiloxane complex (e.g., Ptn $(ViMe_2SiOSiMe_2Vi)_m$, $Pt[(MeViSiO)_4]_m$), platinum-phosphine complex (e.g., $Pt(PPh_3)_4$, $Pt(PBu)_4$), platinum-phosphite complex (e.g., $Pt[P(OPh)_3]_4$) (in which Me represents methyl group, Bu represents butyl group, Vi represents a vinyl group, Ph represents a phenyl group, and m and n each represent an integer), dicarbonyldichloroplatinum, platinum-hydrocarbon complex as disclosed in U.S. Pat. Nos. 3,159,601 and 3,159,662 to Ashby, and platinum alcoholate catalyst as disclosed in U.S. Pat. No. 3,220,972 to Lamoreaux. Further, a platinum chloride-olefin complex as disclosed in U.S. Pat. No. 3,516,946 to Modic is also useful in the present invention. Examples of catalysts employable in the present invention other than platinum compounds include $RhCl(PPh_3)_3$, $RhCl_3$, $RhAl_2O_3$, $RuCl_3$, $IrCl_3$, $FeCl_3$, $AlCl_3$, $PdCl_2.2H_2O$, $NiCl_2$, and $TiCl_4$. These catalysts may be used singly or in combination. Preferred among the foregoing catalysts are chloroplatinic acid, platinum-olefin complex, and platinum-vinylsiloxane complex in the light of catalytic activity.

The amount of the catalyst to be incorporated is not specifically limited. It is preferably used in an amount of from $10^{-1}$ to $10^{-8}$ mol, preferably from $10^{-3}$ to $10^{-7}$ mol per mol of alkenyl group contained in the alkenyl group-containing polyester. If the amount of the catalyst to be incorporated falls below $10^{-8}$ mol, curing cannot proceed sufficiently. In general, a hydrosilylation catalyst is expensive and corrosive. Further, a hydrosilylation catalyst can cause the generation of a large amount of hydrogen gas to result in the foaming of a cured product. Therefore, a hydrosilylation catalyst should not be used in an amount of not less than $10^{-1}$ mol. If hydrosilylation reaction is used to prepare a Si—H group-containing curing agent, the Si—H group-containing curing agent thus obtained still contains a hydrosilylation catalyst. Therefore, the remaining hydrosilylation catalyst can be used as a catalyst for the curing of the alkenyl group-containing polyester resin with the Si—H group-containing curing agent.

The composition of the present invention may further comprise a substance for retarding curing such as compound containing aliphatically unsaturated bond, organic phosphorus compound, nitrogen-containing compound, sulfur-containing compound, acetylene compound, tin compound and organic peroxide incorporated therein in a proper amount for the purpose of controlling the curability thereof. Such a substance may be previously incorporated in the various components of the composition, independently of each other. Such a substance may be incorporated in the powder coating.

Such a curing retardant may be of the type which is vaporized out of the system during heat curing. Alternatively, it may be of the type which is normally present in a closed system but is evaporated in an open system to render a platinum catalyst active. Further, it may be of the type which weakens the coordination to the metal center of a catalyst with the rise in temperature. As such a curing retardant, there may be used an existing compound. Examples of such a curing retardant include ethynyl alcohol, 3-ol-propane, 3-ol-3,3-dimethylpropine, 3-trimethylsiloxypropine, 3-trimethylsiloxy-3,3-dimethylpropine, thiazole, and benzothiazole. Unknown compounds may be used as curing retardants. The amount of the curing retardant to be used may be almost arbitrary so far as the curing retardant is uniformly dispersed in the alkenyl group-containing polyester resin and Si—H group-containing organic curing agent. It is preferably used in an amount of from $10^{-7}$ to $10^{-1}$ mol per mol of the Si—H group-containing organic curing agent. If the amount of the curing retardant falls below $10^{-7}$ mol, sufficient effects cannot be exerted. On the contrary, if the amount of the curing retardant exceeds $10^{-1}$ mol, it inhibits curing. The foregoing curing retardants may be used singly or in admixture.

The powder coating of the present invention may further comprise additives such as pigment (e.g., titanium oxide), adhesivity improver (e.g., epoxy compound or isocyanate compound), leveling agent and smoothening agent incorporated therein as necessary. However, it is undesirable that the powder coating of the present invention comprises a substance or compound for inhibiting hydrosilylation reaction even during heat curing incorporated therein.

The mixture of the alkenyl group-containing polyester resin, the components of the Si—H group-containing curing agent, the components of the hydrosilylation catalyst, and the additives may be heated and melt-kneaded free from solvent, cooled, ground, and then classified to provide a powder coating. Alternatively, these components may be dissolved in an organic solvent, uniformly mixed, and desolvented and powdered by spray drying method or the like to provide a powder coating.

The powder coating obtained according to the present invention preferably exhibits a glass transition temperature of from 0° C. to 100° C. in the light of powder blocking resistance and fluidity during heat melting. If the Si—H group-containing curing agent is liquid, the material thus heated and melt-kneaded can show a remarkable drop in glass transition temperature. In this case, the time required to heat and melt-knead the mixture can be prolonged to raise the glass transition temperature. This approach makes it possible to provide a remarkable improvement in the powder properties of the resulting powder coating.

The powder coating of the present invention may be applied to an object by an ordinary powder coating method, and then heated so that it is cured. The curing temperature may depend on the purpose. In the case where the composition of the present invention is used as a powder coating, the curing reaction is preferably effected at a temperature where the composition can be smoothened after being melted. The powder coating of the present invention can be applied and cured to obtain a durable, weather-resistant and water-resistant coat. Thus, the powder coating of the present invention can be used as a protective coating material, electrical insulating material, mudguard top coating agent, molding resin, etc.

The present invention will be further described in the following examples and comparative examples, but the present invention should not be construed as being limited thereto. The properties of the composition and the properties of the coat as used hereinafter were measured and evaluated by the following methods.

(1) Intrinsic viscosity

Intrinsic viscosity was measured in a mixture of equal weight of phenol and ethane tetrachloride as a solvent at a temperature of 20° C.

(2) Acid value

Acid value was determined by dissolving the material in dioxane, and then titrating the solution with a methanol solution of potassium hydroxide.

(3) Olefin equivalent

Olefin equivalent was determined by titration with iodine.

(4) Melt viscosity

Melt viscosity was measured at a temperature of 180° C. by means of a rheometer.

(5) Yellowing resistance

The baked coat was visually evaluated.

o: no yellowing; Δ: some yellowing; x: remarkable yellowing (6) Smoothness

The external appearance of the coat was visually evaluated.

⊚: very good; o: good; Δ: slightly uneven; x: uneven (7) Powder properties

The powder coating was applied to an object by means of an electrostatic coater to evaluate the powder properties thereof.

o: good; Δ: slightly poor powder properties affecting coatability; x: poor powder properties disabling electrostaic coating.

(8) 60° mirror gloss

60° mirror gloss was determined according to JIS K5400.

(9) Pencil hardness

Pencil hardness was determined according to JIS K5400 using a quality pencil defined in JIS S6006.

(10) Impact resistance

Impact resistance was determined according to JIS K5400 (½ inch φ, 1,000 g).

(11) Workability

A 30-mm wide steel plate coated with the composition of the present invention was bent at an angle of 180 degrees at a temperature of 0° C. Using a 20×magnifier, the steel plate was observed for the occurrence of cracks at the bent portion. IT indicates that the steel plate was bent with a 0.5-mm thick plate superimposed thereon.

o: no cracks observed; Δ: 1 to 5 cracks; x: not less than 6 cracks

(12) Stain resistance

The coat was stained with an oil ink, allowed to stand for 24 hours, wiped with methanol, and then visually evaluated for the degree of remaining stain.

o: no stain; Δ: some stain; x: remarkable stain

(13) Weather resistance

The coat was irradiated with light from sunshine weatherometer for 500 hours, and then visually observed for external appearance.

⊚: very good; o: slightly dull; Δ: dull; x: cracked, peeled

(14) Acid resistance

The coat was dipped in a 0.1N sulfuric acid at room temperature for 24 hours, and then visually observed for external appearance.

⊚: very good; o: slightly dull; Δ: dull; x: cracked, peeled

PREPARATION EXAMPLE 1

Preparation of alkenyl group-containing polyester (1)

1,356 g of dimethylterephthalic acid, 497 g of dimethylisophthalic acid, 248 g of dimethyl-2,6-naphthalenedicarboxylic acid, 270 g of ethylene glycol, 530 g of neopentyl glycol, 60 g of 1,6-hexanediol, 120 g of ethylene glycol monoallyl ether, and dibutyl tin oxide as starting materials were charged into a reaction vessel. The reaction temperature was gradually raised from 100° C. to 180° C. where the reaction mixture was kept in a stream of nitrogen for 3 hours so that the resulting methanol was evaporated. Thereafter, the reaction system was gradually evacuated to 50 mmHg to raise the evaporation rate of methanol. When the discharged amount of the distillate reached little or nothing, the reaction system was evacuated to 2 mmHg where the reaction then continued for 1 hour to obtain an alkenyl group-terminated polyester resin A having an intrinsic viscosity of 0.24 dl/g, an olefin equivalent of 0.50 mmol/g and a melt viscosity (180° C.) of 20 poise.

PREPARATION EXAMPLE 2

Preparation of alkenyl group-containing polyester (2)

1,000 g of Finedex M8020 (available from Dainippon Ink & Chemicals, Inc.; hydroxyl number: 30 KOHmg/g; melt viscosity (180° C.): 25 poise) as a hydroxyl group-terminated polyester for a powder coating, 44 g of allyl isocyanate, and 2 g of dibutyl tin laurate as starting materials were charged into a reaction vessel. The reaction mixture was then heated to a reaction temperature of 150° C. with stirring for 8 hours. Thereafter, the reaction system was gradually evacuated to evaporate the excess allyl isocyanate. Thus, a polyester resin B having an intrinsic viscosity of 0.24 dl/g, an olefin equivalent of 0.51 mol/g and a melt viscosity (180° C.) of 15 poise was obtained.

PREPARATION EXAMPLE 3

Preparation of alkenyl group-containing polyester (3)

1,000 g of Uralac P-3900 (available from DSM; acid value: 33 KOHmg/g; melt viscosity (180° C.): 30 poise) as a carboxylic acid-terminated polyester for a powder coating and 145 g of allyl glycidyl ether as starting materials were charged into a reaction vessel. The reaction mixture was then heated to a reaction temperature of 150° C. with stirring for 8 hours. Thereafter, the reaction system was gradually evacuated to evaporate the excess allyl glycidyl ether. Thus, a polyester resin C having an intrinsic viscosity of 0.24 dl/g, an olefin equivalent of 0.63 mol/g and a melt viscosity (180° C.) of 17 poise was obtained.

PREPARATION EXAMPLE 4

Preparation of carboxylic acid-terminated polyester (1)

1,160 g of terephthalic acid, 330 g of isophthalic acid, 2,200 g of 2,6-naphthalenedicarboxylic acid, 520 g of ethylene glycol, 530 g of neopentyl glycol, and 60 g of 1,6-hexanediol as starting materials were charged into an esterification reaction vessel. The reaction temperature was gradually raised from 100° C. to 250° C. where the reaction system was then allowed to undergo esterification reaction for 4 hours. The resulting esterification product was transferred to a polycondensation reaction vessel where it was then allowed to undergo polycondensation reaction at a temperature of 280° C. under a reduced pressure of not higher than 0.5 Torr in the presence of antimony trioxide as a catalyst in an amount of $2 \times 10^{-4}$ mol/mol of acid component for 3 hours to obtain a polyester having an intrinsic viscosity of 0.51 dl/g. The polyester was then allowed to undergo depolymerization reaction at atmospheric pressure and a temperature of 250° C. in the presence of 9.5 g of isophthalic acid in an inert atmosphere for 2 hours to obtain a carboxylic acid-terminated polyester resin D having an intrinsic viscosity of 0.24 dl/g, an acid value of 0.50 mmol/g and a melt viscosity (180° C.) of 50 poise.

PREPARATION EXAMPLE 5

Polyester polymer-modified Si—H curing agent d

By using a singly-terminated allyl group-modified polycaprolactone (obtained by the modification with an allyl glycidyl ether of a polycaprolactone obtained by the reaction of acetic acid as a starting material; number-average molecular weight: 940) as a polyester polymer, a chainlike hydrogen polysiloxane was modified to obtain a polyester polymer-modified Si—H curing agent.

In some detail, a 500-ml four-necked flask equipped with a stirrer, a thermometer, a condenser, a nitrogen intake pipe and a dropping funnel was placed in an oil bath. Into the flask were then charged 90 ml of toluene and 76.0 g of a chainlike hydrogen polysiloxane (trade name: PS 118; available from Shin-etsu Silicone Co., Ltd.; Si—H group equivalent: 10.0 mmol/g; average structural formula: shown below). The air in the flask was then replaced by nitrogen. The oil bath was then heated so that the internal temperature of the flask was raised to about 70° C. A platinum-vinylsiloxane complex solution ($8.3 \times 10^{-3}$ mmol/μl) was then added to the reaction system as a catalyst in an amount of 76.6 μl ($1 \times 10^{-4}$ equivalent weight based on olefin). Benzothiazole was added to the reaction system as a retardant in an amount of 17.0 mg (20 equivalent weight based on catalyst). A solution of 60.0 g of a singly-terminated allyl group-containing polycaprolactone in 50 g of toluene was then added dropwise to the reaction system through the dropping funnel (number of mols of hydrogen polysiloxane/number of mols of singly-terminated allyl-modified polycaprolactone polymer=3). After the completion of the dropwise addition, the reaction system was allowed to undergo reaction for about 2 hours. When the disappearance of olefin was confirmed by $^1$H NMR, the temperature of the reaction system was lowered. 1 g of activated carbon was then added to the reaction system to remove the catalyst therefrom. The reaction system was then spontaneously filtrated. Toluene was then evaporated away from the filtrate to obtain an oily product.

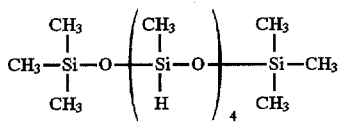

76.2 g (yield: 89%) of a polycaprolactone-modified hydrogen polysiloxane was obtained. The product was then measured for Si—H value. As a result, it was found that the product has a Si—H group equivalent of 2.02 mmol/g. From these results, it was confirmed that the product has 1.1 polycaprolactone polymer chains on the average per molecule of hydrogen siloxane incorporated therein as shown in the following formula:

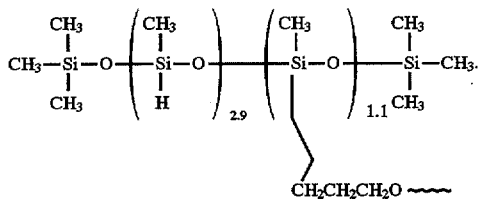

(⁓ indicates polycaprolactone chain)

PREPARATION EXAMPLE 6

Polyester polymer-modified Si—H curing agent e

By using a singly-terminated allyl group-modified polycaprolactone as a polyester polymer, a cyclic hydrogen polysiloxane was modified to obtain a polyester polymer-modified Si—H curing agent.

In some detail, a 500-ml four-necked flask equipped with a stirrer, a thermometer, a condenser, a nitrogen intake pipe and a dropping funnel was placed in an oil bath. Into the flask were then charged 90 ml of toluene and 68.1 g of a cyclic hydrogen polysiloxane (trade name: LS 8600; available from Shin-etsu Silicone Co., Ltd.; Si—H group equivalent: 16.8 mmol/g; structural formula: shown below). The air in the flask was then replaced by nitrogen. The oil bath was then heated so that the internal temperature of the flask was raised to about 70° C. A platinum-vinylsiloxane complex solution ($8.3 \times 10^{-5}$ mmol/μl) was then added to the reaction system as a catalyst in an amount of 114.9 μl ($1 \times 10^{-4}$ equivalent weight based on olefin). Benzothiazole was added to the reaction system as a retardant in an amount of 25.5 mg (20 equivalent weight based on catalyst). A solution of 90.0 g of a singly-terminated allyl group-containing polycaprolactone in 50 g of toluene was then added dropwise to the reaction system through the dropping funnel (number of mols of hydrogen polysiloxane/number of mols of singly-terminated allyl-modified polycaprolactone polymer=5). After the completion of the dropwise addition, the reaction system was allowed to undergo reaction for about 2 hours. When the disappearance of olefin was confirmed by ¹H NMR, the temperature of the reaction system was lowered. 1 g of activated carbon was then added to the reaction system to remove the catalyst therefrom. The reaction system was then spontaneously filtrated. Toluene was then evaporated away from the filtrate to obtain an oily product.

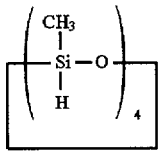

112.8 g (yield: 95%) of a polycaprolactone-modified hydrogen polysiloxane was obtained. The product was then measured for Si—H value. As a result, it was found that the product has a Si—H group equivalent of 2.05 mmol/g. The results of ¹H NMR showed that a Si—H curing agent having a structure represented by the following formula comprising one polycaprolactone chain introduced per molecule of cyclic hydrogen siloxane to an almost ideal extent had been obtained.

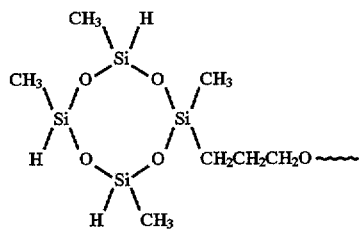

(⁓⁓⁓ indicates polycaprolactone chain)

a catalyst in an amount of 84.8 μl (1×10⁻⁴ equivalent weight based on olefin). Benzothiazole was added to the reaction system as a retardant in an amount of 19.2 mg (20 equivalent weight based on catalyst). A solution of 120.0 g of a bifunctional allyl group-containing polyester in 90 g of toluene was then added dropwise to the reaction system through the dropping funnel in about 1 hour (number of mols of hydrogen polysiloxane/number of mols of double-terminated allyl-modified polyester polymer=10). After the completion of the dropwise addition, the reaction system was allowed to undergo reaction for about 3 hours. When the disappearance of olefin was confirmed by ¹H NMR, the temperature of the reaction system was lowered. 1 g of activated carbon was then added to the reaction system to remove the catalyst therefrom. The reaction system was then spontaneously filtrated. Toluene was then evaporated away from the filtrate. The filtrate was then vacuum-dried at a temperature of 80° C. Thus, a waxy oligomer was obtained.

In this manner, 134.8 g (yield: 89%) of a polyester polymer-modified hydrogen polysiloxane was obtained. The product was then measured for Si—H value. As a result, it was found that the product has a Si—H group equivalent of 1.53 mmol/g. It was thus demonstrated that the product has 1.04 Si—H groups reacted per molecule of the foregoing cyclic hydrogen polysiloxane. Further, the comparison of these results with the results of ¹H NMR showed that the Si—H curing agent thus obtained has a structure comprising a cyclic hydrogen polysiloxane at the end of the polyester molecular chain as shown by the following formula:

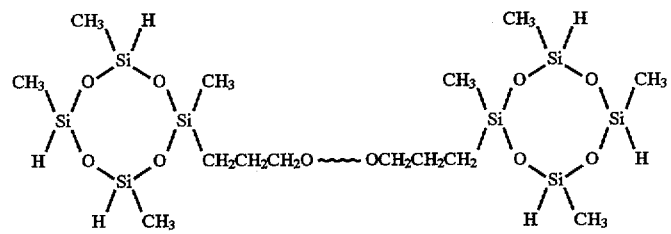

(⁓⁓⁓ indicates polyester chain)

PREPARATION EXAMPLE 7

Polyester polymer-modified Si—H curing agent f

By using a double-terminated allyl group-containing polyester (number-average molecular weight: 3,300) as a polyester polymer, a cyclic hydrogen polysiloxane was modified to obtain a polyester polymer-modified Si—H curing agent. The double-terminated allyl group-containing polyester can be easily prepared by the reaction of an acid-terminated polyester resin with an allyl glycidyl ether (temperature conditions: about 130° C.).

In some detail, a 1,000-ml four-necked flask equipped with a stirrer, a thermometer, a condenser, a nitrogen intake pipe and a dropping funnel was placed in an oil bath. Into the flask were then charged 90 ml of toluene and 86.4 g of a cyclic hydrogen polysiloxane (trade name: LS 8600; available from Shin-etsu Silicone Co., Ltd.). The air in the flask was then replaced by nitrogen. The oil bath was then heated so that the internal temperature of the flask was raised to about 70° C. A platinum-vinylsiloxane complex solution (8.3×10⁻⁵ mmol/μl) was then added to the reaction system as

PREPARATION EXAMPLE 8

Polyester polymer-modified Si—H curing agent g

By using a double-terminated allyl group-containing polyester (number-average molecular weight: 3,306) as a polyester polymer, a chainlike hydrogen polysiloxane was modified to obtain a polyester polymer-modified Si—H curing agent.

In some detail, a 1,000-ml four-necked flask equipped with a stirrer, a thermometer, a condenser, a nitrogen intake pipe and a dropping funnel was placed in an oil bath. Into the flask were then charged 50 ml of toluene and 139.8 g of a chainlike hydrogen polysiloxane (trade name: PS 118; available from Shin-etsu Silicone Co., Ltd.). The air in the flask was then replaced by nitrogen. The oil bath was then heated so that the internal temperature of the flask was raised to about 70° C. A platinum-vinylsiloxane complex solution (8.3×10⁻⁵ mmol/μl) was then added to the reaction system as a reaction catalyst in an amount of 84.8 μl (1×10⁻⁴ equivalent weight based on olefin). Benzothiazole was added to the reaction system as a retardant in an amount of 19.2 mg (20 equivalent weight based on catalyst). A solution of 120.0 g of a double-terminated allyl group-containing polyester in 90 g of toluene was then added dropwise to the reaction system through the dropping funnel in about 2 hours (number of mols of hydrogen polysiloxane/number of mols of double-terminated allyl-modified polyester polymer=10). After the completion of the dropwise addition, the reaction system was allowed to undergo reaction for about 4 hours. When the disappearance of olefin was confirmed by $^1$H NMR, the temperature of the reaction system was lowered. 1 g of activated carbon was then added to the reaction system to remove the catalyst therefrom. The reaction system was then spontaneously filtrated. Toluene was then evaporated away from the filtrate. The filtrate was then vacuum-dried at a temperature of 80° C. Thus, a solid oligomer was obtained.

109.2 g (yield: 81%) of a polyester polymer-modified hydrogen polysiloxane was obtained. The product was then measured for Si—H value. As a result, it was found that the product has a Si—H group equivalent of 1.38 mmol/g. It was thus demonstrated that the product has 1.1 Si—H groups reacted per molecule of the foregoing cyclic hydrogen polysiloxane. Further, the comparison of these results with the results of $^1$H NMR showed that the Si—H curing agent thus obtained has chainlike hydrogen polysiloxanes present at the both ends of the polyester molecular chain in such a manner as shown by the following formula:

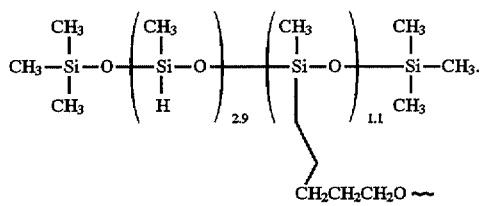

(∼∼∼ indicates polyester chain)

PREPARATION EXAMPLE 9

Acrylic polymer-modified Si—H curing agent h

A 1,000-ml four-necked flask equipped with a thermometer, a stirrer, a dropping funnel, a condenser, and a nitrogen intake pipe was placed in an oil bath. 135.3 g of methyl methacrylate, 25.5 g of allyloxyethyl methacrylate (condensate of ethylene glycol monoallyl ether with acrylic acid), 17.7 g of 2,2'-azobis(4-methoxy-2,4-dimethylvaleronitrile) and 15.2 g of dodecyl mercaptan were dissolved in 120 ml of toluene. 270 ml of toluene was then charged into a three-necked flask where it was then heated to a temperature of 90° C. The foregoing mixture was then added dropwise to the toluene in the three-necked flask through the dropping funnel in 4 hours. Thereafter, a solution of 17.7 g of 2,2'-azobis(4-methoxy-2,4-dimethylvaleronitrile) and 5.1 g of dodecylmercaptan in 10 ml of toluene was added dropwise to the reaction system in 1 hour. After the completion of the reaction, the reaction system was subjected to reprecipitation with 5 1 of hexane. The resulting white solid matter was then dried at a temperature of 80° C. under reduced pressure to obtain 118.5 g of a product. The product was then measured for $^1$H NMR, iodine value by iodine value titration and GPC. As a result, it was confirmed that an acrylic resin containing alkenyl groups in an amount of 1.3 mmol/g (number-average molecular weight: 3,020) had been obtained.

In some detail, a 1,000-ml four-necked flask equipped with a stirrer, a thermometer, a condenser, a nitrogen intake pipe and a dropping funnel was placed in an oil bath. Into the flask were then charged 150 ml of toluene and 79.0 g of a cyclic hydrogen polysiloxane (trade name: LS 8600; available from Shin-etsu Silicone Co., Ltd.). The air in the flask was then replaced by nitrogen. The oil bath was then heated so that the internal temperature of the flask was raised to about 70° C. A platinum-vinylsiloxane complex solution ($8.3 \times 10^{-5}$ mmol/μl) was then added to the reaction system as a reaction catalyst in an amount of 78.5 μl ($1 \times 10^{-4}$ equivalent weight based on olefin). Benzothiazole was added to the reaction system as a retardant in an amount of 17.5 mg (20 equivalent weight based on catalyst). A solution of 50.0 g of an alkenyl group-containing acrylic resin in 150 g of toluene was then added dropwise to the reaction system through the dropping funnel in about 1 hour (number of mols of hydrogen polysiloxane/number of mols of acryl polymer=20). After the completion of the dropwise addition, the reaction system was allowed to undergo reaction for about 3 hours. When the disappearance of olefin was confirmed by $^1$H NMR, the temperature of the reaction system was lowered. 1 g of activated carbon was then added to the reaction system to remove the catalyst therefrom. The reaction system was then spontaneously filtrated. Toluene was then evaporated away from the filtrate. The filtrate was then vacuum-dried at a temperature of 80° C. Thus, a solid oligomer was obtained.

51.2 g (yield: 95%) of an acryl polymer-modified hydrogen polysiloxane was obtained. The product was then subjected to $^1$H NMR measurement to compare the intensity of signal derived from the hydrogen atom in methyl group in Si—CH$_3$ with that of signal derived from the hydrogen atom in Si—H group. As a result, it was found that the product has 1.1 Si—H groups reacted per molecule of the foregoing cyclic hydrogen polysiloxane. The product was also measured for Si—H value. As a result, it was found that the product has a Si—H group equivalent of 2.83 mmol/g. Further, the comparison of these results with the results of GPC showed that the Si—H curing agent thus obtained has cyclic hydrogen polysiloxanes bonded to the acryl molecular chain in such a manner as shown by the following formula:

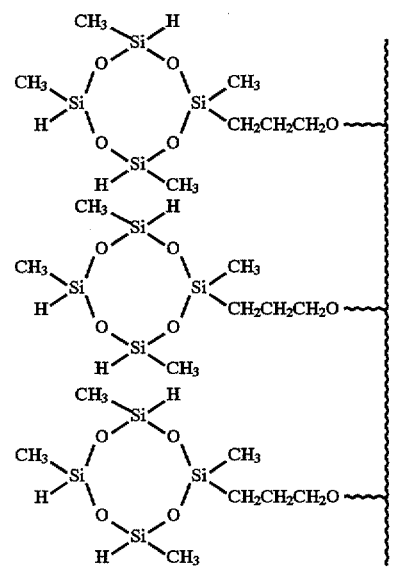

(∼∼∼ indicates acryl chain)

PREPARATION EXAMPLE 10

Acrylic polymer-modified Si—H curing agent i

The same alkenyl group-containing acryl resin as used in Preparation Example 8 was used as an acrylic polymer to modify a chainlike hydrogen polysiloxane, thereby preparing an acrylic polymer-modified Si—H curing agent.

In some detail, a 1,000-ml four-necked flask equipped with a stirrer, a thermometer, a condenser, a nitrogen intake pipe and a dropping funnel was placed in an oil bath. Into the flask were then charged 150 ml of toluene and 132.0 g of a chainlike hydrogen polysiloxane (trade name: PS 118; available from Shin-etsu Silicone Co., Ltd.). The air in the flask was then replaced by nitrogen. The oil bath was then heated so that the internal temperature of the flask was raised to about 70° C. A platinum-vinylsiloxane complex solution ($8.3 \times 10^{-5}$ mmol/μl) was then added to the reaction system as a reaction catalyst in an amount of 78.5 μl ($1 \times 10^{-4}$ equivalent weight based on olefin). Benzothiazole was added to the reaction system as a retardant in an amount of 17.5 mg (20 equivalent weight based on catalyst). A solution of 10.0 g of an allyl group-containing acrylic resin in 30 g of toluene was then added dropwise to the reaction system through the dropping funnel in about 2 hours (number of mols of hydrogen polysiloxane/number of mols of acryl polymer= 20). After the completion of the dropwise addition, the reaction system was allowed to undergo reaction for about 4 hours. When the disappearance of olefin was confirmed by $^1$H NMR, the temperature of the reaction system was lowered. 1 g of activated carbon was then added to the reaction system to remove the catalyst therefrom. The reaction system was then spontaneously filtrated. Toluene was then evaporated away from the filtrate. The filtrate was then vacuum-dried at a temperature of 80° C. Thus, a solid oligomer was obtained.

52.0 g (yield: 92%) of a polyester polymer-modified hydrogen polysiloxane was obtained. The product was then subjected to $^1$H NMR measurement to compare the intensity of signal derived from the hydrogen atom in methyl group in Si—CH$_3$ with that of signal derived from the hydrogen atom in Si—H group. As a result, it was found that the product has 1.1 Si—H groups reacted per molecule of the foregoing cyclic hydrogen polysiloxane. The product was also measured for Si—H value. As a result, it was found that the product has a Si—H group equivalent of 2.48 mmol/g. Further, the comparison of the results of $^1$H NMR with the results of GPC showed that the Si—H curing agent thus obtained has chainlike hydrogen polysiloxanes bonded to the acryl molecular chain in such a manner as shown by the following formula:

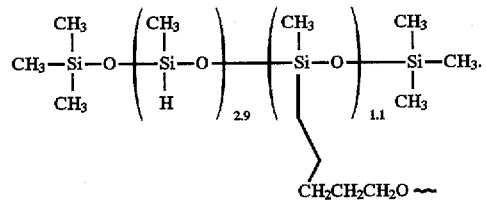

($\sim\sim\sim$ indicates acryl chain)

PREPARATION EXAMPLE 11

Acrylic polymer-modified Si—H curing agent j

A 2,000-ml four-necked flask was equipped with a thermometer, a stirrer, a nitrogen intake pipe and a septum. The flask was then dried with a flow of dried nitrogen. 800 ml of toluene which had been dried through a molecular sieve was then charged into the four-necked flask. Dried nitrogen gas was then passed through the toluene for 30 minutes. The toluene was then cooled to a temperature of about −10° C. To the toluene was then added about 48 ml of a 1.6 mol/l hexane solution of n-butyl lithium. 80 g of methyl methacrylate was then added to the mixture with vigorous stirring. After about 1 hour, 2 g of allyl bromide was added to the reaction system. After the completion of the reaction, the reaction system was subjected to reprecipitation with 2 l of hexane. The resulting white solid matter was then dried at a temperature of 80° C. under reduced pressure to obtain 66.0 g of a product. The product was then measured for NMR, iodine value by iodine value titration and GPC. As a result, it was confirmed that an alkenyl-terminated acrylic resin containing alkenyl group equivalent of 0.98 mmol/g (number-average molecular weight: 1,010) had been obtained.

In some detail, a 500-ml four-necked flask equipped with a stirrer, a thermometer, a condenser, a nitrogen intake pipe and a dropping funnel was placed in an oil bath. Into the flask were then charged 90 ml of toluene and 70.4 g of a chainlike hydrogen polysiloxane (trade name: PS 118; available from Shin-etsu Silicone Co., Ltd.). The air in the flask was then replaced by nitrogen. The oil bath was then heated so that the internal temperature of the flask was raised to about 70° C. A platinum-vinylsiloxane complex solution ($8.3 \times 10^{-5}$ mmol/μl) was then added to the reaction system as a reaction catalyst in an amount of 70.8 μl ($1 \times 10^{-4}$ equivalent weight based on olefin). Benzothiazole was added to the reaction system as a retardant in an amount of 16.0 mg (20 equivalent weight based on catalyst). A solution of 60.0 g of a singly-terminated allyl group-modified acrylic resin in 100 g of toluene was then added dropwise to the reaction system through the dropping funnel (number of mols of hydrogen polysiloxane/number of mols of acryl polymer=3). After the completion of the dropwise addition, the reaction system was allowed to undergo reaction for about 2 hours. When the disappearance of olefin was confirmed by $^1$H NMR, the temperature of the reaction system was lowered. 1 g of activated carbon was then added to the reaction system to remove the catalyst therefrom. The reaction system was then spontaneously filtrated. Toluene was then evaporated away from the filtrate to obtain solid product.

78.7 g (yield: 94%) of an acryl-modified hydrogen polysiloxane was obtained. The product was then measured for Si—H value. As a result, it was found that the product has a Si—H group equivalent of 2.06 mmol/g. From these results, it was confirmed that the product has 1.1 acryl polymer chains on the average per molecule of hydrogen siloxane incorporated therein as shown in the following formula:

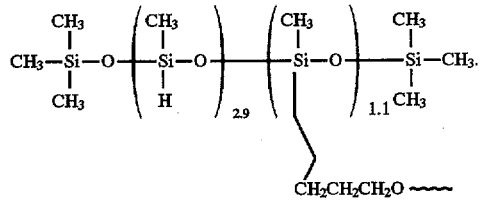

($\sim\sim\sim$ indicates acryl chain)

PREPARATION EXAMPLE 12

Acrylic polymer-modified Si—H curing agent k 67.0 g of an acrylic resin terminated by an alkenyl group (number-average molecular weight: 980) in an amount of 1.02 mmol/g was obtained in the same manner as in Preparation Example 10.

In some detail, a 500-ml four-necked flask equipped with a stirrer, a thermometer, a condenser, a nitrogen intake pipe and a dropping funnel was placed in an oil bath. Into the flask were then charged 100 ml of toluene and 45.5 g of a cyclic hydrogen polysiloxane (trade name: LS 8600; available from Shin-etsu Silicone Co., Ltd.). The air in the flask was then replaced by nitrogen. The oil bath was then heated so that the internal temperature of the flask was raised to about 70° C. A platinum-vinylsiloxane complex solution ($8.3\times10^{-5}$ mmol/μl) was then added to the reaction system as a reaction catalyst in an amount of 79.2 μl ($1\times10^{-4}$ equivalent weight based on olefin). Benzothiazole was added to the reaction system as a retardant in an amount of 17.9 mg (20 equivalent weight based on catalyst). A solution of 65.0 g of a singly-terminated allyl group-containing acryl polymer in 100 g of toluene was then added dropwise to the reaction system through the dropping funnel (number of mols of hydrogen polysiloxane/number of mols of acyl polymer=3). After the completion of the dropwise addition, the reaction system was allowed to undergo reaction for about 2 hours. When the disappearance of olefin was confirmed by $^1$H NMR, the temperature of the reaction system was lowered. 1 g of activated carbon was then added to the reaction system to remove the catalyst therefrom. The reaction system was then spontaneously filtrated. Toluene was then evaporated away from the filtrate to obtain an oily product. Thus, 76.5 g (yield: 95%) of an acryl-modified hydrogen polysiloxane was obtained. The product was then measured for Si—H value. As a result, it was found that the product has a Si—H group equivalent of 1.93 mmol/g. Thus, a Si—H curing agent had been obtained having a structure represented by the following formula comprising 1.2 acryl chains introduced per molecule of cyclic hydrogen siloxane to an almost ideal extent.

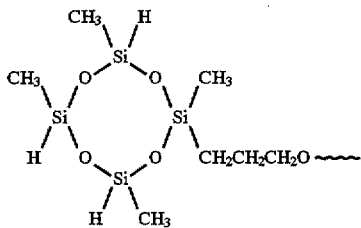

(∼∼∼ indicates acryl chain)

PREPARATION EXAMPLE 13

Saturated hydrocarbon polymer-modified Si—H curing agent 1

50 ml of toluene was added to 300 g of hydrogenated polyisoprene having hydroxyl group at both ends thereof (Epole, available from Idemitsu Petrochemical Co., Ltd.) so that the polyisoprene was subjected to dehydration by azeotropic deaeration. A solution of 48 g of t-BuOK in 200 ml of THF was then added dropwise to the reaction system in about 30 minutes. After the completion of the dropwise addition, the reaction system was allowed to undergo reaction at a temperature of about 50° C. for 1 hour. After the completion of the reaction, 30 g of aluminum silicate was added to the reaction solution so that the resulting salt was adsorbed thereby. The reaction solution was then stirred at room temperature for about 30 minutes. The reaction solution was then spontaneously filtrated. THF was then evaporated away from the filtrate to obtain about 230 g of an allyl-terminated hydrogenated polyisoprene in the form of viscous product. $^1$H NMR analysis showed that the product has allyl groups introduced at 95% of the ends thereof. The measurement of iodine value showed that the molar amount of olefin contained in the product is 1.094 mmol/g.

In some detail, a 500-ml four-necked flask equipped with a stirrer, a thermometer, a condenser, a nitrogen intake pipe and a dropping funnel was placed in an oil bath. Into the flask were then charged 50 ml of toluene and 78.0 g of a cyclic hydrogen polysiloxane (trade name: LS 8600; available from Shin-etsu Silicone Co., Ltd.). The air in the flask was then replaced by nitrogen. The oil bath was then heated so that the internal temperature of the flask was raised to about 70° C. A platinum-vinylsiloxane complex solution ($8.3\times10^{-5}$ mmol/μl) was then added to the reaction system as a reaction catalyst in an amount of 79.2 μl ($1\times10^{-4}$ equivalent weight based on olefin). Benzothiazole was added to the reaction system as a retardant in an amount of 18.0 mg (20 equivalent weight based on catalyst). A solution of 60.0 g of an allyl-terminated hydrogenated polyisoprene in 100 g of toluene was then added dropwise to the reaction system through the dropping funnel (number of mols of hydrogen polysiloxane/number of mols of allyl group-modified saturated hydrocarbon polymer=10). After the completion of the dropwise addition, the reaction system was allowed to undergo reaction for about 3 hours. When the disappearance of olefin was confirmed by NMR, the temperature of the reaction system was lowered. 1 g of activated carbon was then added to the reaction system to remove the catalyst therefrom. The reaction system was then spontaneously filtrated. Toluene was then evaporated away from the filtrate. The filtrate was then vacuum-dried at a temperature of 80° C. to obtain an oligomer in the form of viscous liquid.

Thus, 64.8 g (yield: 86%) of a hydrogenated polyisoprene polymer-modified hydrogen polysiloxane was obtained. The product was then measured for Si—H value. As a result, it was found that the product has a Si—H group equivalent of 2.36 mmol/g. It was thus found that the product has 1.1 Si—H groups reacted per molecule of the foregoing cyclic hydrogen polysiloxane. The comparison with the results of NMR measurement showed that the Si—H curing agent thus obtained has a structure shown by the following formula comprising a cyclic hydrogen polysiloxane bonded to saturated hydrocarbon polymer chain.

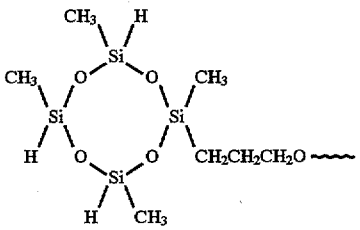

(∼∼∼ indicates saturated hydrocarbon chain)

PREPARATION EXAMPLE 14

Saturated hydrocarbon polymer-modified Si—H curing agent m

A 1,000-ml four-necked flask equipped with a stirrer, a thermometer, a condenser, a nitrogen intake pipe and a dropping funnel was placed in an oil bath. Into the flask were then charged 100 ml of toluene and 218.0 g of a chainlike hydrogen polysiloxane (trade name: PS 118; available from Shin-etsu Silicone Co., Ltd.). The air in the flask was then replaced by nitrogen. The oil bath was then heated so that the internal temperature of the flask was raised to about 70° C. A platinum-vinylsiloxane complex solution ($8.3\times10^{-5}$ mmol/μl) was then added to the reaction system as a reaction catalyst in an amount of 132.0 μl ($1\times10^{-4}$ equivalent weight based on olefin). Benzothiazole was added to the reaction system as a retardant in an amount of 30.0 mg (20 equivalent weight based on catalyst). A solution of 100.0 g of an allyl-terminated hydrogenated polyisoprene in 150 g of toluene was then added dropwise to the reaction system through the dropping funnel in about 1 hour (number of mols of hydrogen polysiloxane/number of mols of acryl polymer= 10). After the completion of the dropwise addition, the reaction system was allowed to undergo reaction for about 3 hours. When the disappearance of olefin was confirmed by NMR, the temperature of the reaction system was lowered. 1 g of activated carbon was then added to the reaction system to remove the catalyst therefrom. The reaction system was then spontaneously filtrated. Toluene was then evaporated away from the filtrate. The filtrate was then vacuum-dried at a temperature of 80° C. to obtain an oligomer in the form of viscous solid.

Thus, 113.0 g (yield: 93%) of a hydrogenated polyisoprene polymer-modified hydrogen polysiloxane was obtained. The product was then measured for Si—H value. As a result, it was found that the product has a Si—H group equivalent of 2.12 mmol/g. It was thus found that the product has 1.2 Si—H groups reacted per molecule of the foregoing cyclic hydrogen polysiloxane. The comparison with the results of NMR measurement showed that the Si—H curing agent thus obtained has a structure shown by the following formula comprising a chainlike hydrogen polysiloxane bonded to the ends of saturated hydrocarbon polymer chain.

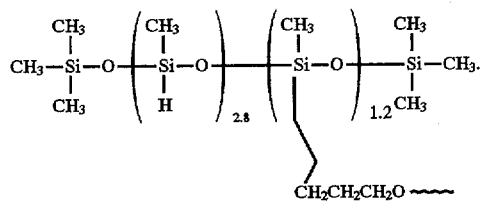

($\sim\sim\sim$ indicates saturated hydrocarbon chain)

PREPARATION EXAMPLE 15

Hydrocarbon organic group-modified Si—H curing agent n

A 300-ml four-necked flask equipped with a stirrer, a thermometer, a condenser, a nitrogen intake pipe and a dropping funnel was placed in an oil bath. Into the flask were then charged 50 ml of toluene and 46.9 g of a cyclic hydrogen polysiloxane (trade name: LS 8600; available from Shin-etsu Silicone Co., Ltd.). The air in the flask was then replaced by nitrogen. The oil bath was then heated so that the internal temperature of the flask was raised to about 70° C. 78 µl ($1 \times 10^{-5}$ equivalent weight based on olefin) of a platinum-vinylsiloxane complex solution ($8.3 \times 10^{-5}$ mmol/µl) as a reaction catalyst and 9.6 g of allylanisole were then added dropwise to the reaction system in about 1 hour (number of mols of hydrogen polysiloxane/number of mols of allylanisole=3). After the completion of the dropwise addition, the reaction system was allowed to undergo reaction for about 3 hours. When the disappearance of olefin was confirmed by NMR, the temperature of the reaction system was lowered. 1 g of activated carbon was then added to the reaction system to remove the catalyst therefrom. The reaction system was then spontaneously filtrated. Toluene was then evaporated away from the filtrate to obtain 25.2 g (yield: 92%) of a liquid product. The product was then measured for Si—H value. As a result, it was found that the product has a Si—H group equivalent of 7.74 mmol/g. It was thus found that the product has 1.0 Si—H group reacted per molecule of the foregoing cyclic hydrogen polysiloxane. The comparison with the results of NMR measurement showed that the Si—H curing agent thus obtained has a structure shown by the following formula:

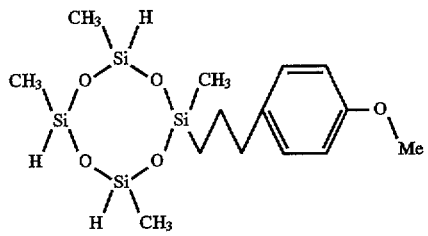

PREPARATION EXAMPLE 16

Hydrocarbon organic group-modified Si—H curing agent o

A 500-ml four-necked flask equipped with a stirrer, a thermometer, a condenser, a nitrogen intake pipe and a dropping funnel was placed in an oil bath. Into the flask were then charged 100 ml of toluene and 96.0 g of a cyclic hydrogen polysiloxane (trade name: LS 8600; available from Shin-etsu Silicone Co., Ltd.). The air in the flask was then replaced by nitrogen. The oil bath was then heated so that the internal temperature of the flask was raised to about 80° C. 9.6 µl ($1 \times 10^{-6}$ equivalent weight based on olefin) of a platinum-vinylsiloxane complex solution ($8.3 \times 10^{-6}$ mmol/µl) as a reaction catalyst was then added to the reaction system. A solution of 96.0 g of 2,2-bis(4-allyloxyphenyl) propane in 15 ml of toluene was then added dropwise to the reaction system in about 30 minutes (number of mols of hydrogen polysiloxane/number of mols of 2,2-bis(4-allyloxyphenyl)propane=10). After the completion of the dropwise addition, the reaction system was allowed to undergo reaction for about 10 hours. When the disappearance of olefin was confirmed by NMR, the temperature of the reaction system was lowered. 1 g of activated carbon was then added to the reaction system to remove the catalyst therefrom. The reaction system was then spontaneously filtrated. Toluene was then evaporated away from the filtrate to obtain 31.5 g (yield: almost 100%) of a liquid product. The product was then measured for Si—H value. As a result, it was found that the product has a Si—H group equivalent of 7.84 mmol/g. The comparison with the results of NMR measurement showed that the Si—H curing agent thus obtained has a structure shown by the following formula:

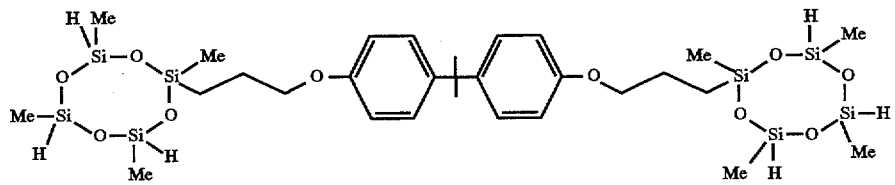

EXAMPLES 1 TO 15

As shown in Tables 1 to 5, to the polyester resins A to C produced in the foregoing Preparation Examples 1 to 3 were added the following Si—H group-containing curing agents a to c and the Si—H group-containing curing agents d to o shown in the foregoing Preparation Examples as curing agents, a platinum-vinylsiloxane complex as a curing catalyst and benzothiazole as a curing retardant in amounts shown in these tables, respectively. Titanium dioxide and Acronal 4F as a leveling agent were then added to the mixture in an amount of 50 parts by weight and 1 part by weight based on 100 parts by weight of the sum of the weight of polyester resin and curing agent, respectively. The mixtures thus obtained were each dry-blended by means of a Type FM20B Henschel mixer (available from Mitsui Miike Seisakujo K.K.), melt-kneaded by means of a Type PR-46 co-kneader (available from Busu Inc.) at a temperature of 120° C. cooled and solidified, crushed, and then classified through a 145-mesh metal net to obtain powder coatings.

If the curing agent was liquid, all the compounds except the Si—H group-containing curing agent were dry-blended at once. The curing agent was then added to the mixture by means of a syringe pump through an intake port during the melt-kneading at a temperature of 120° C. by the co-kneader. Si—H group-containing curing agent a:

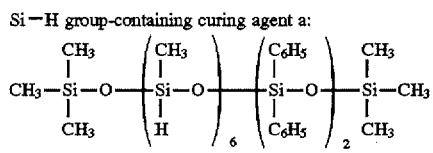

Si—H group-containing curing agent b:

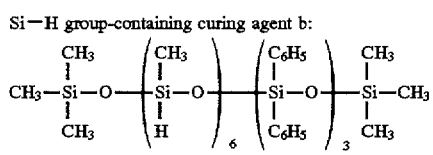

Si—H group-containing curing agent c:

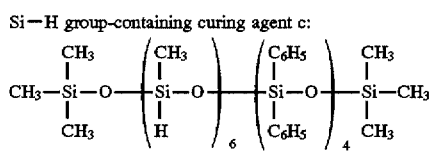

COMPARATIVE EXAMPLES 1 TO 3

As shown in Table 6, to the polyester resin D prepared in the foregoing Preparation Example 4, Finedex M8020 (available from Dainippon Ink & Chemicals, Inc.) used as a polyester resin in the foregoing Preparation Example 2 and Uralac P-3900 (available from DSM) used as a polyester resin in the foregoing Preparation Example 3 were added the curing agents and curing catalysts shown in the table in amounts shown in the table, respectively. Titanium dioxide and Acronal 4F as a leveling agent were then added to the mixture in an amount of 50 parts by weight and 1 part by weight based on 100 parts by weight of the sum of the weight of polyester resin and curing agent, respectively. The mixtures thus obtained were each dry-blended by means of a Type FM20B Henschel mixer (available from Mitsui Miike Seisakujo K.K.), melt-kneaded by means of a Type PR-46 co-kneader (available from Busu Inc.) at a temperature of 120° C., cooled and solidified, crushed, and then classified through a 145-mesh metal net to obtain powder coatings.

The powder coatings thus obtained were each electrostatically coated on a 0.5-mm thick zinc phosphorus-treated steel plate to a thickness of from 50 to 60 μm, and then baked at a temperature of 180° C. for 20 minutes to form a coat thereon. The results of evaluation of the various coats thus formed are set forth in Tables 1 to 6 below.

TABLE 1

| | Example 1 | Example 2 | Example 3 |
| --- | --- | --- | --- |
| Polyester resin | | | |
| Kind | A | A | A |
| Addition amount | 92.9 g | 92.9 g | 92.9 g |
| Curing agent | | | |
| Kind | Si—H group-containing curing agent a | Si—H group-containing curing agent b | Si—H group-containing curing agent c |
| Addition amount | 7.1 g | 12.5 g | 14.2 g |
| Curing catalyst | | | |
| Kind | Platinum-vinylsiloxane complex | Platinum-vinylsiloxane complex | Platinum-vinylsiloxane complex |
| Addition amount | 0.8 mg | 0.8 mg | 0.8 mg |
| Curing retardant | | | |
| Kind | Benzothiazole | Benzothiazole | Benzothiazole |
| Addition amount | 30 mg | 30 mg | 30 mg |
| Yellowing resistance | ○ | ○ | ○ |
| Smoothness | ⊙ | ⊙ | ⊙ |
| Powder properties | Δ | Δ | Δ |
| 60° surface gloss (%) | 98 | 99 | 97 |
| Skim thickness (μm) | — | — | — |
| Pencil hardness | F | F | F |
| Impact resistance | >150 | >150 | >150 |
| Workability | ○ | ○ | ○ |
| Stain resistance | ○ | ○ | ○ |
| Weather resistance | ⊙ | ⊙ | ⊙ |
| Acid resistance | ⊙ | ○ | ○ |

TABLE 2

| | Example 4 | Example 5 | Example 6 |
| --- | --- | --- | --- |
| Polyester resin | | | |
| Kind | B | B | B |
| Addition amount | 91.3 g | 91.3 g | 91.3 g |
| Curing agent | | | |
| Kind | Si—H group-containing curing agent d | Si—H group-containing curing agent e | Si—H group-containing curing agent f |
| Addition amount | 27.7 g | 27.3 g | 36.5 g |
| Curing catalyst | | | |
| Kind | Platinum-vinylsiloxane complex | Platinum-vinylsiloxane complex | Platinum-vinylsiloxane complex |
| Addition amount | 0.9 mg | 0.9 mg | 0.9 mg |
| Curing retardant | | | |
| Kind | Benzothiazole | Benzothiazole | Benzothiazole |
| Addition amount | 30 mg | 30 mg | 30 mg |
| Yellowing resistance | ○ | ○ | ○ |
| Smoothness | ⊙ | ⊙ | ⊙ |
| Powder properties | ○ | ○ | ○ |
| 60° surface gloss (%) | 92 | 89 | 91 |
| Skim thickness (μm) | — | — | — |
| Pencil hardness | H | F | F |
| Impact resistance | >150 | >150 | >150 |
| Workability | ○ | ○ | ○ |
| Stain resistance | ○ | ○ | ○ |
| Weather resistance | ⊙ | ⊙ | ⊙ |
| Acid resistance | ○ | ○ | ○ |

TABLE 3

|  | Example 7 | Example 8 | Example 9 |
|---|---|---|---|
| Polyester resin |  |  |  |
| Kind | B | C | C |
| Addition amount | 91.3 g | 88.2 g | 88.2 g |
| Curing agent |  |  |  |
| Kind | Si—H group-containing curing agent g | Si—H group-containing curing agent h | Si—H group-containing curing agent i |
| Addition amount | 40.5 g | 23.6 g | 26.9 g |
| Curing catalyst |  |  |  |
| Kind | Platinum-vinylsiloxane complex | Platinum-vinylsiloxane complex | Platinum-vinylsiloxane complex |
| Addition amount | 0.9 mg | 0.9 mg | 0.9 mg |
| Curing retardant |  |  |  |
| Kind | Benzothiazole | Benzothiazole | Benzothiazole |
| Addition amount | 30 mg | 35 mg | 35 mg |
| Yellowing resistance | ○ | ○ | ○ |
| Smoothness | ⊚ | ⊚ | ⊚ |
| Powder properties | ○ | ○ | ○ |
| 60° surface gloss (%) | 91 | 99 | 97 |
| Skim thickness (μm) | — | — | — |
| Pencil hardness | H | H | H |
| Impact resistance | >150 | >150 | >150 |
| Workability | ○ | ○ | ○ |
| Stain resistance | ○ | ○ | ○ |
| Weather resistance | ⊚ | ⊚ | ⊚ |
| Acid resistance | ○ | ⊚ | ⊚ |

TABLE 4

|  | Example 10 | Example 11 | Example 12 |
|---|---|---|---|
| Polyester resin |  |  |  |
| Kind | C | C | C |
| Addition amount | 88.2 g | 88.2 g | 88.2 g |
| Curing agent |  |  |  |
| Kind | Si—H group-containing curing agent j | Si—H group-containing curing agent k | Si—H group-containing curing agent l |
| Addition amount | 32.4 g | 34.5 g | 28.3 g |
| Curing catalyst |  |  |  |
| Kind | Platinum-vinylsiloxane complex | Platinum-vinylsiloxane complex | Platinum-vinylsiloxane complex |
| Addition amount | 0.9 mg | 0.9 mg | 0.9 mg |
| Curing retardant |  |  |  |
| Kind | Benzothiazole | Benzothiazole | Benzothiazole |
| Addition amount | 35 mg | 35 mg | 35 mg |
| Yellowing resistance | ○ | ○ | ○ |
| Smoothness | ⊚ | ⊚ | ⊚ |
| Powder properties | ○ | ○ | ○ |
| 60° surface gloss (%) | 98 | 99 | 97 |
| Skim thickness (μm) | — | — | — |
| Pencil hardness | H | H | H |
| Impact resistance | >150 | >150 | >150 |
| Workability | ○ | ○ | ○ |
| Stain resistance | ○ | ○ | ○ |
| Weather resistance | ⊚ | ⊚ | ⊚ |
| Acid resistance | ⊚ | ⊚ | ⊚ |

TABLE 5

|  | Example 13 | Example 14 | Example 15 |
|---|---|---|---|
| Polyester resin |  |  |  |
| Kind | C | C | C |
| Addition amount | 88.2 g | 88.2 g | 88.2 g |
| Curing agent |  |  |  |
| Kind | Si—H group-containing curing agent m | Si—H group-containing curing agent n | Si—H group-containing curing agent o |
| Addition amount | 31.5 g | 8.6 g | 8.5 g |
| Curing catalyst |  |  |  |
| Kind | Platinum-vinylsiloxane complex | Platinum-vinylsiloxane complex | Platinum-vinylsiloxane complex |
| Addition amount | 0.9 mg | 0.9 mg | 0.9 mg |
| Curing retardant |  |  |  |
| Kind | Benzothiazole | Benzothiazole | Benzothiazole |
| Addition amount | 35 mg | 35 mg | 35 mg |
| Yellowing resistance | ○ | ○ | ○ |
| Smoothness | ⊚ | ⊚ | ⊚ |
| Powder properties | ○ | ○ | ○ |
| 60° surface gloss (%) | 98 | 99 | 97 |
| Skim thickness (μm) | — | — | — |
| Pencil hardness | H | H | H |
| Impact resistance | >150 | >150 | >150 |
| Workability | ○ | ○ | ○ |
| Stain resistance | ○ | ○ | ○ |
| Weather resistance | ⊚ | ⊚ | ⊚ |
| Acid resistance | ⊚ | ⊚ | ⊚ |

TABLE 6

|  | Comparative Example 1 | Comparative Example 2 | Comparative Example 3 |
|---|---|---|---|
| Polyester resin |  |  |  |
| Kind | D | M-8020 | P-3900 |
| Addition amount | 95.0 g | 80.4 g | 94.7 g |
| Curing agent |  |  |  |
| Kind | PT-810 | Kureran UI | XL-552 |
| Addition amount | 5.0 g | 19.6 g | 5.3 g |
| Curing catalyst |  |  |  |
| Kind |  | Dibutyl tin dilaurate |  |
| Addition amount |  | 0.2 g |  |
| Curing retardant |  |  |  |
| Kind |  |  |  |
| Addition amount |  |  |  |
| Yellowing resistance | ○ | Δ | x |
| Smoothness | Δ | ○ | Δ |
| Powder properties | ○ | ○ | ○ |
| 60° surface gloss (%) | 96 | 98 | 95 |
| Skim thickness (μm) | — | 50 | 100 |
| Pencil hardness | H | HB | F |
| Impact resistance | >150 | 120 | >150 |
| Workability | Δ | ○ | ○ |
| Stain resistance | ○ | ○ | ○ |
| Weather resistance | ○ | ○ | Δ |
| Acid resistance | Δ | Δ | Δ |

Polyester resin M-8020: Finedex, available from Dainippon Ink & Chemicals, Inc.
Polyester resin P-3900: Uralac P-3900, available from DSM
Curing agent PT-810: Triglycidyl isocyanurate, available from Ciba Geigy Inc.
Curing agent Kureran UI: Block isocyanate, available from Bier Inc.

Curing agent XL-552: Bis(N,N-dihydroxyethyl)adipamide, available form Rhom & Haas Inc.

As mentioned above, the powder coating obtained according to the present invention comprises a resin composition comprising an alkenyl group-containing polyester resin, a Si—H group-containing curing agent and a hydrosilylation catalyst. The powder coating of the present invention undergoes hydrosilylation reaction to perform curing. Thus, the powder coating of the present invention causes no stain on the furnace due to volatile content from the curing agent. Further, the coat thus formed has no skim developed thereon. As compared with the carboxylic acid-terminated polyester or hydroxyl group-terminated polyester to be incorporated in the conventional polyester powder coating, the alkenyl group-containing polyester resin exhibits a low melt viscosity during heat melting. Thus, the resulting coat exhibits an improved smoothness. Since the bond produced by crosslinking reaction is Si—C bond, the powder coating of the present invention can provide a coat excellent in yellowing resistance during baking as well as in weather resistance.

While the invention has been described in detail and with reference to specific embodiments thereof, it will be apparent to one skilled in the art that various changes and modifications can be made therein without departing from the spirit and scope thereof.

What is claimed is:

1. A powder coating composition containing, as a main component, a polyester resin composition comprising (A) an alkenyl group-containing polyester resin with a number-average molecular weight of from 500 to 100,000 having at least 1.2 alkenyl groups on the average per molecule, (B) a Si—H group-containing curing agent having at least two Si—H groups per molecule, and (C) a catalyst active in hydrosilylation.

2. The powder coating composition according to claim 1, wherein said Si—H group-containing curing agent is represented by formula (1):

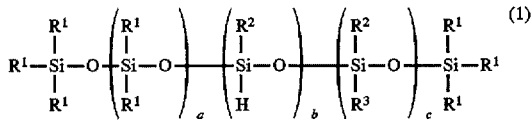

wherein $R^1$ and $R^2$ each represent a $C_{1-7}$ alkyl group or a phenyl group; $R^3$ represents an organic group having a molecular weight of not less than 100; a represents an integer of from not less than 0 to not more than 100; b represents an integer of from not less than 2 to not more than 100; and c represents an integer of from not less than 0 to not more than 100.

3. The powder coating composition according to claim 1, wherein said Si—H group-containing curing agent is represented by formula (2):

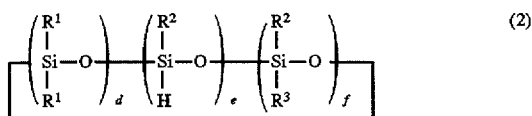

wherein $R^1$, $R^2$ and $R^3$ are as defined above; d represents an integer of from not less than 0 to not more than 8; e represents an integer of from not less than 2 to not more than 10; and f represents an integer of from not less than 0 to not more than 8, with the proviso that d, e and f satisfy the relationship $3 \leq d+e+f \leq 10$.

4. The powder coating composition according to claim 1, wherein said Si—H group-containing curing agent is represented by formula (3):

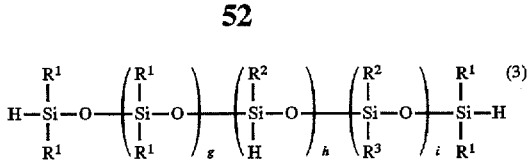

wherein $R^1$, $R^2$ and $R^3$ are as defined above; g represents an integer of from not less than 0 to not more than 100; h represents an integer of from not less than 2 to not more than 100; and i represents an integer of from not less than 0 to not more than 100.

5. The powder coating composition according to claim 1, wherein said Si—H group-containing curing agent is an organic group-modified hydrogen polysiloxane with a molecular weight of from 300 to 50,000 having at least one Si—H group-containing substituents represented by formula (4) and/or formula (5):

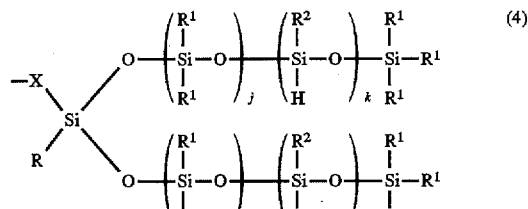

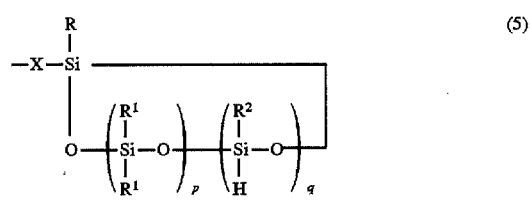

wherein $R^1$ and $R^2$ are as defined above; j, k, m and n each represent 0 or a positive integer, with the proviso that j, k, m and n satisfy the relationships $0 \leq j+m \leq 100$ and $1 \leq k+n \leq 100$; p represents an integer of from not less than 0 to not more than 8; q represents an integer of from not less than 1 to not more than 10, with the proviso that p and q satisfy the relationship $3 \leq p+q \leq 10$; X represents a divalent bonding group such as —O—, —COO— and —CH$_2$CH$_2$—; and R represents a monovalent substituent selected from the group consisting of H, OSi(CH$_3$)$_3$ and $C_{1-10}$ organic group, in the molecule or at the end of an organic polymer or an organic group having a molecular weight of not less than 100.

6. The powder coating composition according to any one of claims 2 to 4, wherein said organic group $R^3$ is a polyester polymer.

7. The powder coating composition according to any one of claims 2 to 4, wherein said organic group $R^3$ is an acrylic polymer.

8. The powder coating composition according to any one of claims 2 to 4, wherein said organic group $R^3$ comprises a saturated hydrocarbon polymer and/or hydrocarbon chain.

9. The powder coating composition according to claim 2, wherein c is an integer of from not less than 1 to not more than 100.

10. The powder coating composition according to claim 3, wherein f is an integer of from not less than 1 to not more than 100.

11. The powder coating composition according to claim 4, wherein i is an integer of from not less than 1 to not more than 100.

12. The powder coating composition according to claim 5, wherein said organic polymer is an acrylic polymer.

13. The powder coating composition according to claim 5, wherein said organic polymer is a polyester polymer.

14. The powder coating composition according to claim 5, wherein said organic polymer comprises a saturated hydrocarbon polymer and/or hydrocarbon chain.

15. The powder coating composition according to any one of claims 2 to 4, wherein said Si—H group-containing curing agent is methylphenylhydrogenpolysiloxane.

16. The powder coating composition according to claim 1, wherein said alkenyl group constituting said alkenyl group-containing polyester resin is represented by formula (6):

(6)

wherein $R^4$ represents a $C_{1-20}$ divalent organic group; $R^5$ represents a hydrogen atom, a methyl group or an ethyl group; and $R^6$ represents a hydrogen atom or a methyl group.

17. The powder coating composition according to claim 1, wherein said alkenyl group-containing polyester resin has a glass transition temperature of from 0° C. to 100° C.

18. The powder coating composition according to claim 1, wherein said polyester resin composition has a glass transition temperature of from 0° C. to 100° C.

19. The powder coating composition according to claim 1, wherein the Si—H group-containing curing agent is a solid curing agent.

* * * * *